(12) United States Patent
Rowe

(10) Patent No.: US 7,303,473 B2
(45) Date of Patent: Dec. 4, 2007

(54) NETWORK GAMING SYSTEM

(75) Inventor: Richard E. Rowe, Reno, NV (US)

(73) Assignee: IGT, Reno, NV (US)

( * ) Notice: Subject to any disclaimer, the term of this patent is extended or adjusted under 35 U.S.C. 154(b) by 639 days.

(21) Appl. No.: 10/082,650

(22) Filed: Feb. 25, 2002

(65) Prior Publication Data

US 2003/0162594 A1 Aug. 28, 2003

(51) Int. Cl.
A63F 13/00 (2006.01)
(52) U.S. Cl. ..................................................... 463/42
(58) Field of Classification Search ............ 463/16–20, 463/12–13, 24–29, 36–43; 700/91–93; 707/1–3, 707/100–102, 104.1; 273/148 B, 455–461, 273/292
See application file for complete search history.

(56) References Cited

U.S. PATENT DOCUMENTS

| | | | |
|---|---|---|---|
| 4,339,798 A | | 7/1982 | Hedges et al. |
| 5,762,552 A | * | 6/1998 | Vuong et al. ................. 463/25 |
| 5,980,384 A | | 11/1999 | Barrie |
| 6,089,982 A | * | 7/2000 | Holch et al. .................. 463/42 |
| 6,098,985 A | * | 8/2000 | Moody ......................... 273/292 |
| 6,183,366 B1 | | 2/2001 | Goldberg et al. |
| 6,264,560 B1 | | 7/2001 | Goldberg et al. |
| 6,273,820 B1 | * | 8/2001 | Haste, III ..................... 463/40 |
| 6,280,325 B1 | | 8/2001 | Fisk |
| 6,409,602 B1 | * | 6/2002 | Wiltshire et al. ............. 463/42 |
| 6,575,834 B1 | * | 6/2003 | Lindo ............................ 463/40 |

FOREIGN PATENT DOCUMENTS

| | | |
|---|---|---|
| EP | 1 013 321 A1 | 6/2000 |
| EP | 1 078 667 A1 | 2/2001 |
| EP | 1 177 822 A1 | 2/2002 |

OTHER PUBLICATIONS

Declaration of Jeffery Lino in regard to patent of Pellegrini, U.S. Ser. No. 4,575,622, issued Mar. 11, 1986, and entitled "Electronic Access Control System for Coin-operated Games and Like Selectively Accessible Devices."
International Search Report for Application No. PCT/US02/09669 dated Jul. 21, 2004.

* cited by examiner

Primary Examiner—Robert E Pezzuto
(74) Attorney, Agent, or Firm—Beyer Weaver LLP

(57) ABSTRACT

An apparatus and method of operating a website computing apparatus may comprise receiving at the website computing apparatus game selection data representing a game selection from a player device via the Internet, transmitting a data communication from the website computing apparatus to either a first gaming apparatus that facilitates play of a first game if the game selection data represents the first game, or to a second gaming apparatus that facilitates play of a second game if the game selection data represents the second game, receiving at the website computing apparatus game display data from one of the gaming apparatuses, transmitting the game display data to the remote player device via the Internet, receiving at the website computing apparatus wager data from the remote player device via the Internet, transmitting the wager data to either the first or second gaming apparatus.

37 Claims, 16 Drawing Sheets

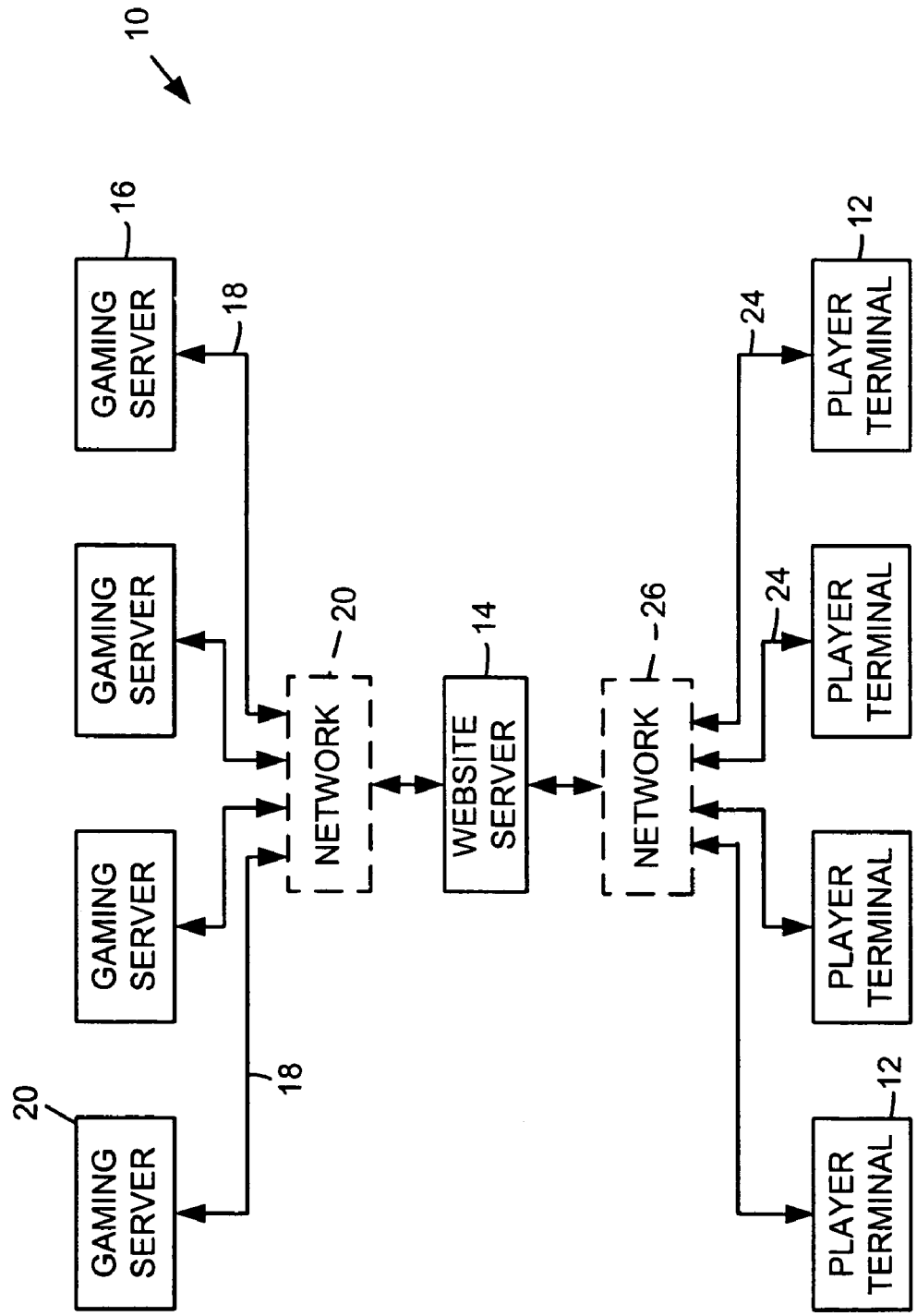

FIG. 3A

WELCOME TO GAMING CENTRAL
PLEASE LOGIN

- 132 — FIRST NAME
- 134 — LAST NAME
- 136 — ADDRESS 1
- 138 — ADDRESS 2
- 140 — PASSWORD
- 142 — CREDIT CARD NO.
- 144 — EXPIRATION DATE

FIG. 3B

PLEASE SELECT A GAME

| DRAW POKER — 152 | SLOTS A — 162 |
| BONUS POKER — 154 | SLOTS B — 164 |
| TRIPLE PLAY POKER — 156 | BLACKJACK — 166 |
| 10-PLAY POKER — 158 | BINGO — 168 |
| 50-PLAY POKER — 160 | KENO — 170 |

SIGN OFF — 172

| GAME # | GAME ID | WAGER | AMOUNT WON | AMOUNT LOST | INITIAL CREDITS | REMAINING CREDITS | ELAPSED TIME |
|---|---|---|---|---|---|---|---|
| 1 | POKER 3 | 1.00 | 0 | 1.00 | 20.00 | 19.00 | 10 |
| 2 | POKER 3 | 1.00 | 6.00 | 0 | 19.00 | 24.00 | 12 |
| 3 | POKER 1 | .50 | 0 | .50 | 24.00 | 23.50 | 12 |
| 4 | POKER 1 | .50 | 2.50 | 0 | 23.50 | 25.50 | 10 |

FIG. 10
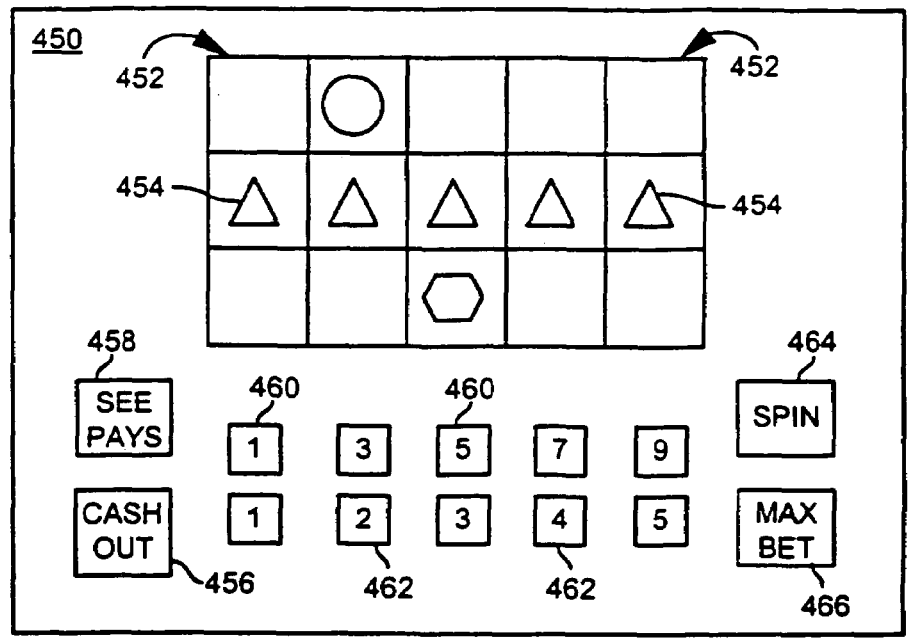
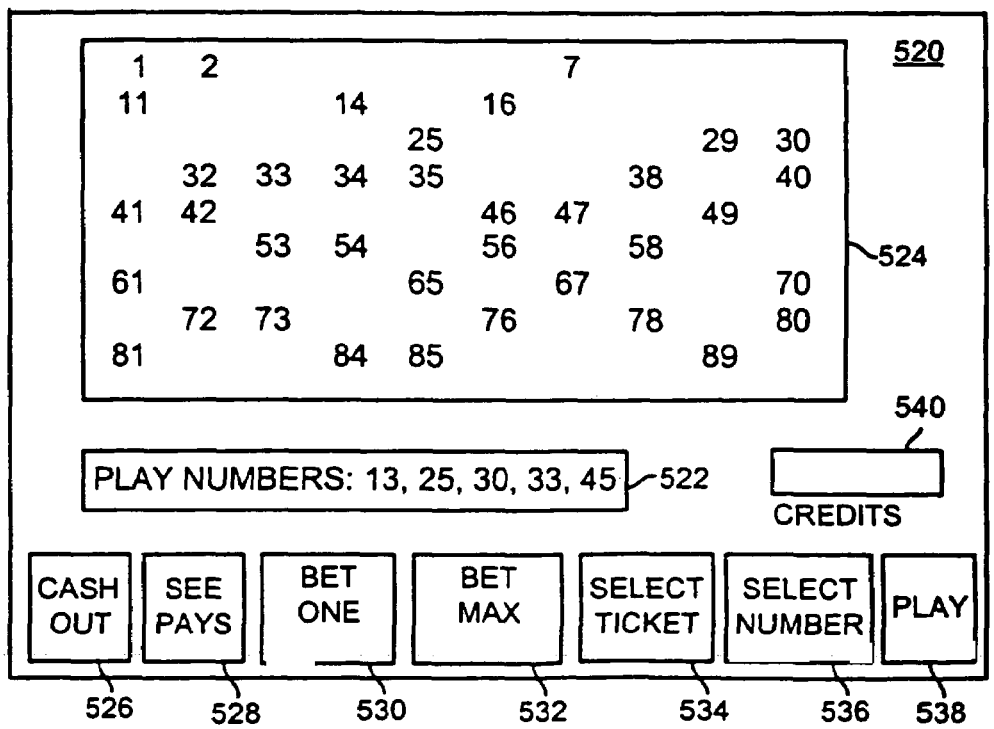
FIG. 11

NETWORK GAMING SYSTEM

BACKGROUND

This patent is directed to a networked gaming system that may include a website server which may be accessed by a plurality of players via remotely located player terminals.

Various network gaming systems have been previously described. For example, U.S. Pat. No. 6,280,325 to Fisk discloses a computer network which manages multiple simultaneous bingo games having a potentially large number of bingo cards. The computers simultaneously and in parallel compare called bingo numbers to bingo cards stored in each respective computer and also double-verify winning cards. Called numbers may be applicable to one, many, or all of the simultaneous bingo games, and the games may have different times or different rules. Bingo cards are distributed in the network in accordance with number of hits needed by the cards: "one-away" computers handle bingo cards needing one more hit; "two-away" computers handle cards needing two hits. The computers in the network also generate statistics on the progress of bingo cards toward winning patterns. The winning pattern for any game can be changed in real-time, as desired to continue interest in the game.

U.S. Pat. No. 6,264,560 to Goldberg, et al. discloses a game playing method and apparatus for automating games such as blackjack, poker, craps, roulette, baccarat and pai gow, wherein players may play continuously and asynchronously, and information related to advertised items can be exchanged between players and advertisers. In one embodiment, each instance of a game is likely unique from all other current game instances. The games do not require a manual dealer and in one embodiment, played in a gaming establishment using low cost gaming stations. The system may also be used to play such games on the Internet or an interactive cable television network wherein a game controller communicates with players at network nodes in their homes and at their leisure.

U.S. Pat. No. 6,183,366 to Goldberg, et al. discloses an information service and advertising providing system for presenting interactive information services together with interactive advertising on a communications network such as the Internet and LANs. The information service may be a game played interactively on the network while advertising is communicated between users and an advertising network node. Users may also be provided with various games and/or game tournaments via interactive network communications. Users may respond to advertising while being entertained (e.g., via games), or while interacting with another network service.

SUMMARY OF THE INVENTION

In one aspect, the invention is directed to a website controller that controls the operation of a website. The controller may comprise a processor; a memory operatively coupled to the processor; a first computer program portion stored in the memory that causes data prompting a game selection to be made to be transmitted to a remote player device to allow a first game or a second game to be selected via the remote player device; a second computer program portion stored in the memory that causes game selection data representing a game selection that is received from the remote player device to be stored in memory; a third computer program portion stored in the memory that facilitates data communication between the remote player device and a first gaming computer that facilitates play of the first game if the game selection data specifies the first game; and a fourth computer program portion stored in the memory that facilitates data communication between the remote player device and a second gaming computer that facilitates play of the second game if the game selection data specifies the second game.

In another aspect, the invention is directed to a method of operating a website computing apparatus. The method may comprise receiving at the website computing apparatus via the Internet game selection data representing a game selection from a player device remote from the website computing apparatus, the game selection data representing either a first game or a second game; receiving at the website computing apparatus game display data from a first gaming apparatus that facilitates play of the first game if the game selection data represents the first game; receiving at the website computing apparatus game display data from a second gaming apparatus that facilitates play of the second game if the game selection data represents the second game; transmitting the game display data from the website computing apparatus to the remote player device via the Internet; receiving at the website computing apparatus wager data from the remote player device via the Internet; transmitting the wager data from the website computing apparatus to the first gaming apparatus if the game selection data represents the first game; and transmitting the wager data from the website computing apparatus to the second gaming apparatus if the game selection data represents the second game.

In another aspect, the invention is directed to a method of operating a gaming apparatus. The method may comprise transmitting first game display data from the gaming apparatus to a website computing apparatus, the first game display data representing a first game image relating to a game that may be played via a player device that is remote from the website computing apparatus and that is remote from the gaming apparatus, the first game display data being included in a data communication having a destination address that specifies the player device; receiving wager data from the website computing apparatus, the wager data being included in a data communication having a source address that specifies the player device; transmitting second game display data from the gaming apparatus to the website computing apparatus, the second game display data representing a second game image relating to the game, the second game display data being included in a data communication having a destination address that specifies the player device; and transmitting outcome data from the gaming apparatus to the website computing apparatus, the outcome data representing an outcome of the game, the outcome data being included in a data communication having a destination address that specifies the player device.

In a further aspect, the invention may comprise a gaming controller. The gaming controller may comprise a processor; a memory operatively coupled to the processor; a first computer program portion stored in the memory that causes first game display data to be transmitted from the gaming controller to a website computing apparatus, the first game display data representing a first game image relating to a game that may be played via a player device that is remote from the website computing apparatus and that is remote from the gaming apparatus, the first game display data being included in a data communication having a destination address that specifies the player device; a second computer program portion stored in the memory that causes wager data to be received from the website computing apparatus, the wager data being included in a data communication having a source address that specifies the player device; a third computer program portion stored in the memory that causes second game display data to be transmitted from the gaming controller to the website computing apparatus, the second game display data representing a second game image relating to the game, the second game display data being included in a data communication having a destination address that specifies the player device; and a fourth computer program portion stored in the memory that causes outcome data to be transmitted from the gaming controller to the website computing apparatus, the outcome data representing an outcome of the game, the outcome data being included in a data communication having a destination address that specifies the player device.

Additional aspects of the invention are defined by the claims at the end of this patent.

BRIEF DESCRIPTION OF THE DRAWINGS

Various embodiments of the invention are described in connection with the drawings, a brief description of which is provided below:

FIG. 1 is a block diagram of an embodiment of a gaming system in accordance with the invention;

FIG. 3A is an illustration of an embodiment of a logon display that may be displayed on one of the player terminals;

FIG. 3B is an illustration of an embodiment of a game selection display that may be displayed on one of the player terminals;

FIG. 10 is an illustration of an embodiment of a visual display that may be displayed during performance of the slots routine of FIG. 12;

FIG. 11 is an illustration of an embodiment of a visual display that may be displayed during performance of the keno routine of FIG. 13;

DETAILED DESCRIPTION OF VARIOUS EMBODIMENTS

Figure 2A:
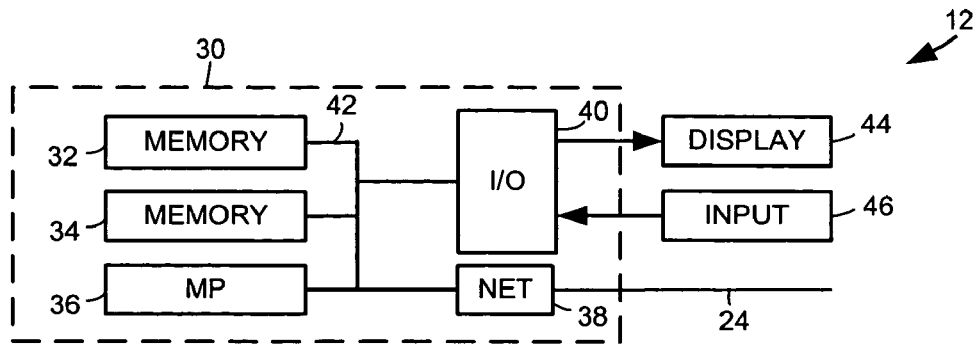
FIG. 2A is a block diagram of one of the player terminals shown schematically in FIG. 1.

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, it is not intended that the scope of any claim element be interpreted based on the application of 35 U.S.C. § 112, sixth paragraph.

Gaming System

FIG. 1 illustrates one possible embodiment of a gaming system 10, which may be an Internet gaming system, that is shown operatively coupled to a plurality of remote player terminals 12. The gaming system 10 may include a website server 14 and a plurality of gaming servers 16 operatively coupled to the website server 14 via a plurality of data links 18, a network 20, and a data link 22 connected between the network 20 and the website server 14. The network 20 may comprise, for example, the Internet, a wide area network (WAN), or a local area network (LAN). The player terminals 12 may be operatively coupled to the website server 14 via a plurality of data links 24, a network 26, and a data link 28 connected between the network 26 and the website server 14. The network 26 may comprise, for example, the Internet, a wide area network (WAN), or a local area network (LAN). Each of the networks 20, 26 may include a plurality of network computers or server computers (not shown), each of which may be operatively interconnected. Where the networks 20, 26 comprises the Internet, data communication may take place over the communication links 22, 28 via an Internet communication protocol.

The website server 14 may be located at a first physical location, and the gaming servers 16 may be provided at the same location as the website server 14 or in locations that are remote from the website server 14, such as in a different building, city or state. For example, the website server 14 may be located at the company that operates the website, and each of the gaming servers 16 may be located at a respective one of a different gaming company or casino. Thus, the four gaming servers 16 shown in FIG. 1 could be located at four different locations, and the website server 14 could be located at a fifth location. Each of the player terminals 12 may be located in a different location than the website server 14, and each player terminal 12 may be located in a different location than all of the other player terminals 12. For example, each player terminal 12 may be located in a person's house, or each player terminal 12 could be located in a separate hotel room.

Although FIG. 1 illustrates that the gaming system 10 comprises four gaming servers 16 and one website server 14 for sake of simplicity, it should be understood that different numbers of gaming servers 16 and more than one website server 14 could be used. Although FIG. 1 illustrates four player terminals 12, many more player terminals 12, such as hundreds or thousands, could be operatively coupled to the website server 14.

Overall Operation

During operation, a player could utilize one of the player terminals 12 to logon to the website serviced by the website server 14 in order to play various wagering games, such as poker, blackjack, slots, bingo or keno. The website server 14 may be programmed to allow the player to select a particular game or games from a menu that includes numerous games. Each of the gaming servers 16 operatively coupled to the website server 14 may include computer gaming software that facilitates play of one or more of the games offered by the website server 14. After a game is selected by the player using the player terminal 12, the selected game may then be played under the control of the gaming server 16 that contains the computer software associated with the selected game. While play of the game is controlled by the particular gaming server 16 that offers the selected game, all data communications necessary for play of the game may be routed through the website server 14 so that the player is unaware of the operative involvement of the gaming server 16. Such data communications may include, for example, wagering data specified by the player via the player terminal 12 and display data stored in the gaming server 16 for the selected game. Thus, it may appear to the player that the website server 14 is handling all aspects and control actions relating to the game being played.

Player Terminals

Each player terminal 12 may be disposed in a different location, such as a person's home or a hotel room. Each of the player terminals may be either a smart terminal, such as a personal computer or a laptop computer, or a dumb terminal that does not include a controller. FIG. 2A is a block diagram of one possible embodiment of one of the player terminals 12. Although one of the player terminals 12 is described below in connection with FIG. 2A, it should be understood that the structure of the player terminals 12 may be different, and each of the player terminals 12 may have a different design or structure than the other player terminals 12.

Referring to FIG. 2A, the player terminal 12 may include a controller 30 that may comprise a plurality of memories 32, 34, a microcontroller or microprocessor (MP) 36, a network communication circuit 38, such as an Ethernet board for example, and an input/output (I/O) circuit 40, all of which may be interconnected via an address/data bus 42.

It should be appreciated that although only one microprocessor 36 is shown, the controller 30 may include multiple microprocessors 36. The memories 32, 34 may include random-access memories (RAMs) and program memories in which computer program instructions are stored, such as being stored electronically or magnetically. Although the I/O circuit 40 is shown as a single block, it should be appreciated that the I/O circuit 40 may include a number of different types of I/O circuits. The memories 32, 34 may be implemented as semiconductor memories, magnetically readable memories, and/or optically readable memories, for example. One or both of the memories of the controller 30 may be a read/write or alterable memory, such as a hard disk. In the event a hard disk is used, the address/data bus 40 shown schematically in FIG. 2A may comprise multiple address/data buses, which may be of different types, and there may be an I/O circuit disposed between the address/data buses.

The player terminal 12 may include a personal computer operating system, such as Windows® 2000 or another Windows® operating system commercially available from Microsoft®. The player terminal 12 may also include a display unit 44, such as a cathode ray tube or flat panel display device, and one or more input devices 46, such as a keyboard and/or a mouse.

Website Server

Figure 2B:
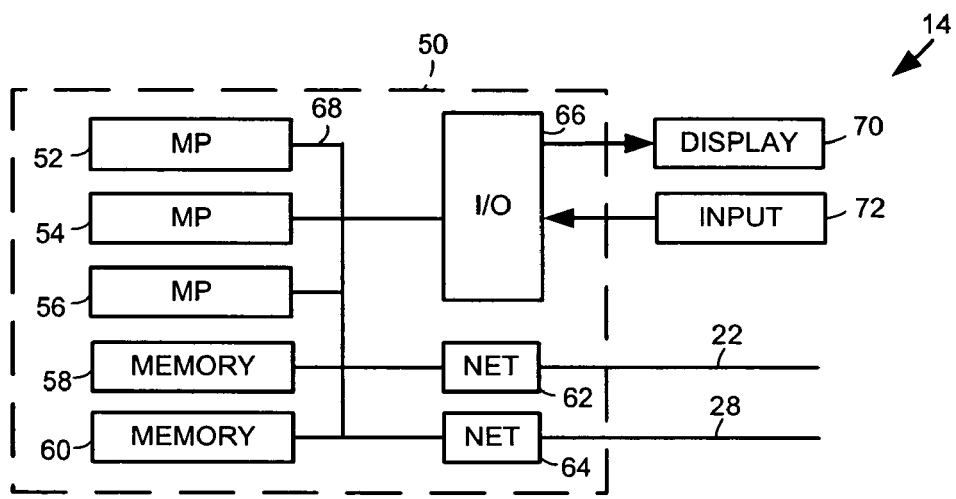
FIG. 2B is a block diagram of the website server shown schematically in FIG. 1.

Referring to FIG. 2B, the website server 14 may include a controller 50 that may comprise a plurality of microcontrollers or microprocessors (MP) 52, 54, 56, a plurality of memories 58, 60, a first network communication circuit 62 coupled to the data link 22 for communicating with the gaming servers 16, a second network communication circuit 64 coupled to the data link 28 for communicating with the player terminals 12, and an input/output (I/O) circuit 66, all of which may be interconnected via an address/data bus 68. The microprocessors 52, 54, 56 may be designed to operate in parallel as a parallel processing system. The memories 58, 60 may include random-access memories (RAMs) and program memories in which computer program instructions are stored, such as being stored electronically or magnetically. Although the I/O circuit 66 is shown as a single block, it should be appreciated that the I/O circuit 66 may include a number of different types of I/O circuits. The memories 58, 60 may be implemented as semiconductor memories, magnetically readable memories, and/or optically readable memories, for example. One or both of the memories 58, 60 of the controller 50 may be a read/write or alterable memory, such as a hard disk. In the event a hard disk is used, the address/data bus 68 shown schematically in FIG. 2B may comprise multiple address/data buses, which may be of different types, and there may be an I/O circuit disposed between the address/data buses. The website server 14 may include a server operating system, a display unit 70, such as a cathode ray tube or flat panel display device, and one or more input devices 72, such as a keyboard and/or a mouse.

Gaming Servers

Figure 2C:
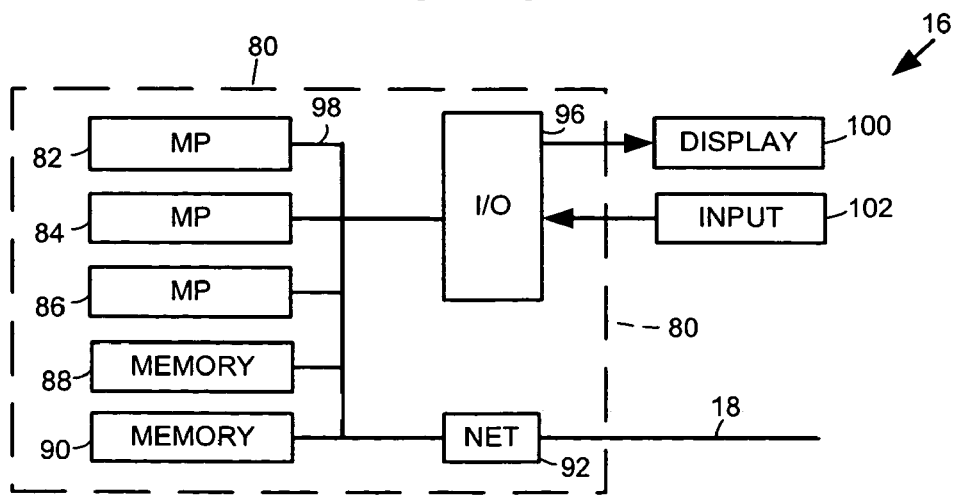
FIG. 2C is a block diagram of one of the gaming servers shown schematically in FIG. 1.

Although one possible embodiment of one of the gaming servers 16 is described below in connection with FIG. 2C, it should be understood that the structure of the gaming servers 16 could be different than that described and that each gaming server 16 could have a different structure. Referring to FIG. 2C, one of the gaming servers 16 may include a controller 80 that may comprise a plurality of microcontrollers or microprocessors (MP) 82, 84, 86, a plurality of memories 88, 90, a network communication circuit 92 coupled to the data link 18 for communicating with the website server 14, and an input/output (I/O) circuit 96, all of which may be interconnected via an address/data bus 98. The microprocessors 82, 84, 86 may be designed to operate in parallel as a parallel processing system. The memories 88, 90 may include random-access memories (RAMs) and program memories in which computer program instructions are stored, such as being stored electronically or magnetically. Although the I/O circuit 96 is shown as a single block, it should be appreciated that the I/O circuit 96 may include a number of different types of I/O circuits. The memories 88, 90 may be implemented as semiconductor memories, magnetically readable memories, and/or optically readable memories, for example. One or both of the memories 88, 90 of the controller 80 may be a read/write or alterable memory, such as a hard disk. In the event a hard disk is used, the address/data bus 98 shown schematically in FIG. 2C may comprise multiple address/data buses, which may be of different types, and there may be an I/O circuit disposed between the address/data buses. The gaming server 16 may include a server operating system, a display unit 100, such as a cathode ray tube or flat panel display device, and one or more input devices 102, such as a keyboard and/or a mouse.

Website Server Operation

One manner in which the website server 14 may operate is described below in connection with a number of flowcharts which represent a number of portions or routines of one or more computer programs, which may be stored in one or more of the memories 58, 60 of the website server controller 50. The computer program portions may be written in any high level language such as C, C+, C++ or the like or any low-level, assembly or machine language. By storing the computer program portions therein, various portions of the memories 58, 60 are physically and/or structurally configured in accordance with computer program instructions.

Figure 4:
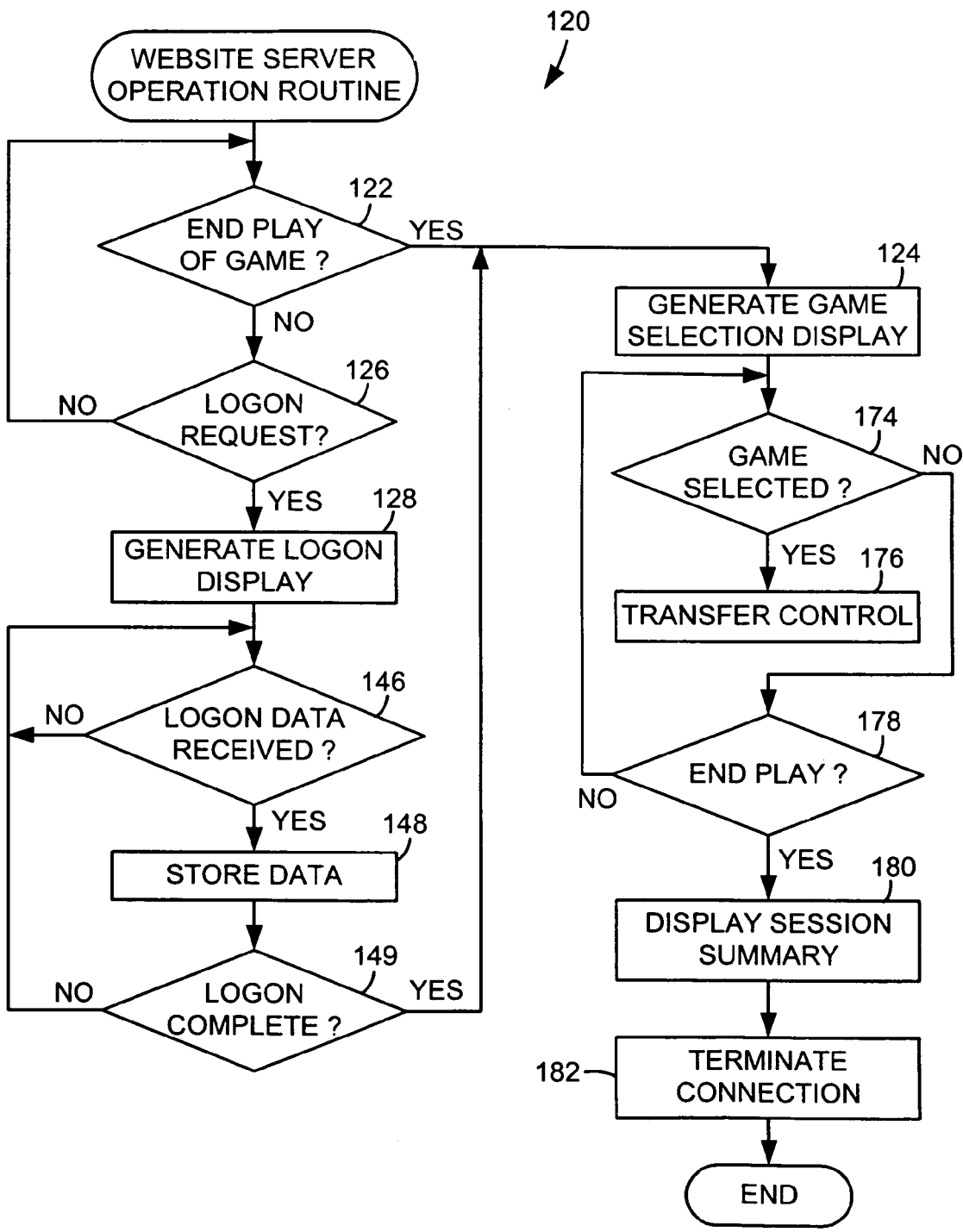
FIG. 4 is a flowchart of an embodiment of a website server operation routine.

FIG. 4 is a flowchart of one possible embodiment of an operation software routine 120 that may be performed by the website server 14. Referring to FIG. 4, at block 122 the website server 14 may determine whether a player has indicated a desire to stop playing a particular game that the player has been playing via one of the gaming servers 16. During play of a particular game, the gaming server 16 which provides the gaming software for that game controls the operation of the game. When the player indicates a desire to stop playing that game, the gaming server 16 transfers operational control back to the website server 14, in which case the routine may branch to block 124 at which a game selection display may be generated on the display unit 44 (FIG. 2A) of the player terminal 12 being used by the player.

At block 126 the routine may determine whether a logon request has been received from a player, via one of the player terminals 12, indicating a desire to initiate a gaming session. The logon request could be, for example, the entry by the player of the Internet address of the website associated with the website server 14. If a logon request is received, the routine may cause a logon display to be generated on the display unit 44 of the player who transmitted the logon request. To generate the logon display, the website server 14 may cause display data representing a logon display image to be transmitted to the player terminal 12. Various image data, including logon image data, may be stored in one of the memories 58, 60 of the website server 14.

One example of a logon display 130 that could be generated on the player's display unit 44 is shown in FIG. 3A. Referring to FIG. 3A, the logon display 130 may include a data entry box 132 for entry of the first name of the player, a data entry box 134 for entry of the last name of the player, a data entry box 136 for entry of the street address of the player, a data entry box 138 for entry of the city, state and/or zip code of the player, a data entry box 140 for entry of a password of the player, a data entry box 142 for entry of a credit card number of the player, and a data entry box 144 for entry of the expiration date of the credit card of the player.

Referring back to FIG. 4, if the website server 14 has received logon data from the player as determined at block 146, that data may be stored in one of the memories 58, 60 of the website server 14 at block 148. If the website server 14 has received all of the required logon data as determined at block 149, the routine may branch to block 124. If not, the routine may branch back to block 146 to await further logon data from the player.

At block 124, the routine may cause a game selection display to be generated on the display unit 44 of the player terminal 12. To generate the game selection display, the website server 14 may cause display data representing a game selection display image to be transmitted to the player terminal 12. The display data may be stored in one of memories 58, 60 of the website server 14. Block 124 may be performed in response to a player initially logging onto the website (i.e. after the completion of block 149) or in response to a player's desire to end a game that is being provided under the control of one of the gaming servers 16 as described above (i.e. after the completion of block 122).

One example of a game selection display 150 that could be generated on the player's display unit 44 is shown in FIG. 3B. Referring to FIG. 3B, the game selection display 150 may include a plurality of player-activatable icons, or game images, each of which represents a respective game that the player may play via the website associated with the website server 14. The icons may include, for example, an icon 152 associated with a draw poker game, an icon 154 associated with a bonus poker game, an icon 156 associated with a triple play poker game, an icon 158 associated with a 10-play poker game, an icon 160 associated with a 50-play poker game, an icon 162 associated with a first slots game, an icon 164 associated with a second slots game, an icon 166 associated with a blackjack game, an icon 168 associated with a bingo game, and an icon 170 associated with a keno game. Where the input device 46 (FIG. 2A) of the player terminal 12 is a mouse, the icons may be player-activatable via the mouse. Alternatively, each of the game icons may have a unique letter associated therewith and a game could be selected by inputting one of the unique letters via a keyboard.

The games that are available to play via the website serviced by the website server 14 may be provided by the gaming servers 16 in various ways. For example, if twenty games were available via the website and if the website server 14 were operatively coupled to four gaming servers 16, each of those four gaming servers 16 could be programmed to facilitate play of exactly five of the games.

As another example, if the ten games represented by the ten icons shown in FIG. 3B were available for play and if four gaming servers 16 were connected to the website server 14, a first of the gaming servers 16 could be programmed with gaming software that facilitates play of each of the poker games represented by the icons 152, 154, 156, 158, 160, a second of the gaming servers 16 could be programmed with gaming software that facilitates play of the two slots games represented by the icons 162, 164, a third gaming server 16 could be programmed with gaming software that facilitates play of the blackjack game represented by the icon 166, and the fourth gaming server 16 could be programmed with gaming software that facilitates play of the bingo and keno games represented by the icons 168, 170. Each game may be available for play via only one of the gaming servers 16. In other words, only one of the four gaming servers 16 could contain gaming software that facilitates play of the triple play poker game represented by the icon 156, in which case that particular gaming server 16 would have to be utilized if a player desired to play the triple play poker game.

Alternatively, each of the gaming servers 16 may provide a plurality of games that are available only from a respective gaming provider. In that case, each of the gaming servers 16 may be programmed with gaming software that facilitates one or more poker games (and/or other games), but each of the poker games may be different, such as by having different visual displays, different wagering options, different gaming options, etc.

In any case, each of the games available for play via the website may have one and only one gaming server 16 on which gaming software that facilitates play of that game is stored. One of the memories 58, 60 of the website server 14 could store data that identifies the particular gaming server 16 that provides gaming software that implements each of the games available via the website. One example of such data is set forth below.

| Game | Gaming Server |
|---|---|
| Draw Poker | #1 |
| Bonus Poker | #1 |
| Triple Play Poker | #2 |
| 10-Play Poker | #2 |
| 50-Play Poker | #2 |
| Slots A | #3 |
| Slots B | #3 |
| Blackjack | #4 |
| Bingo | #5 |
| Keno | #6 |

Referring to FIG. 4, at block 174 if a player selected one of the games available via the website as described above, the routine may transfer operational control to the gaming server 16 that provides gaming software to play that game. For example, if the above table were used and if the player selected Triple Play Poker, the routine would transfer operational control to gaming server #2.

Figures 3C, 3D:
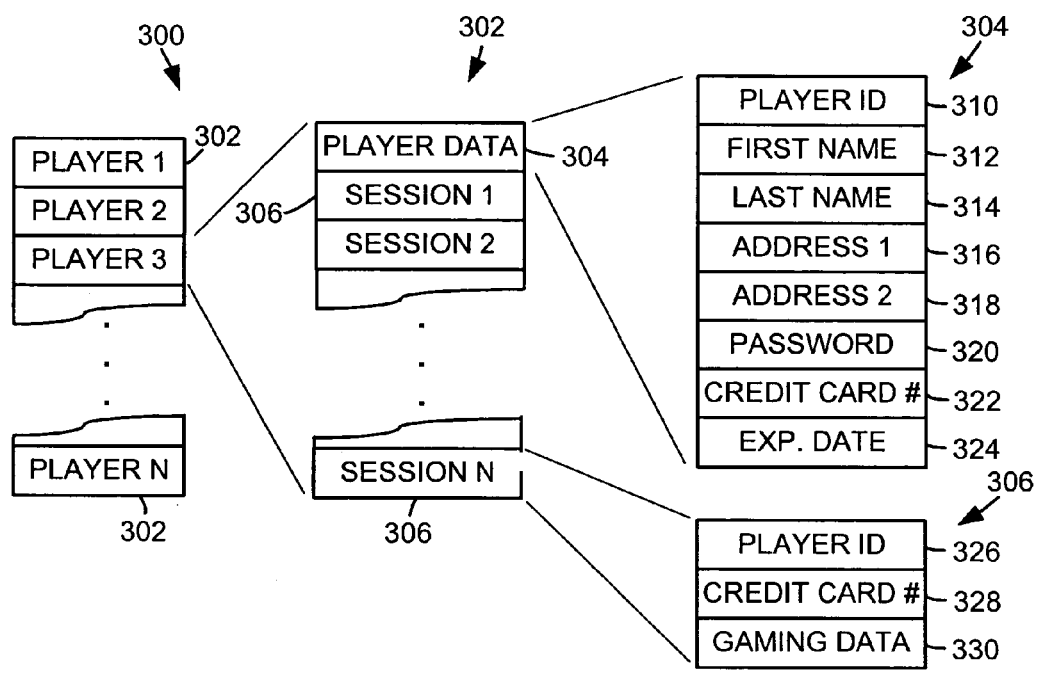
FIGS. 3C and 3D illustrate one manner in which gaming data could be stored in memory.

If the player elected to end play at the website, such as by activating the "Sign Off" icon 172 shown in FIG. 3B, the routine may branch to block 180 at which point a gaming session summary may be displayed on the display unit 44 of the player terminal 12. The gaming session summary may provide the player with summary data, such as how much money was won and what games were played, or all of the data shown in FIG. 3D. The player could then print out the summary display shown on the display unit 44 to save a physical record of the gaming session. At block 182, the routine may terminate the Internet link between the website and the player terminal 12.

Website Server Transmit Routine

Figure 5A:
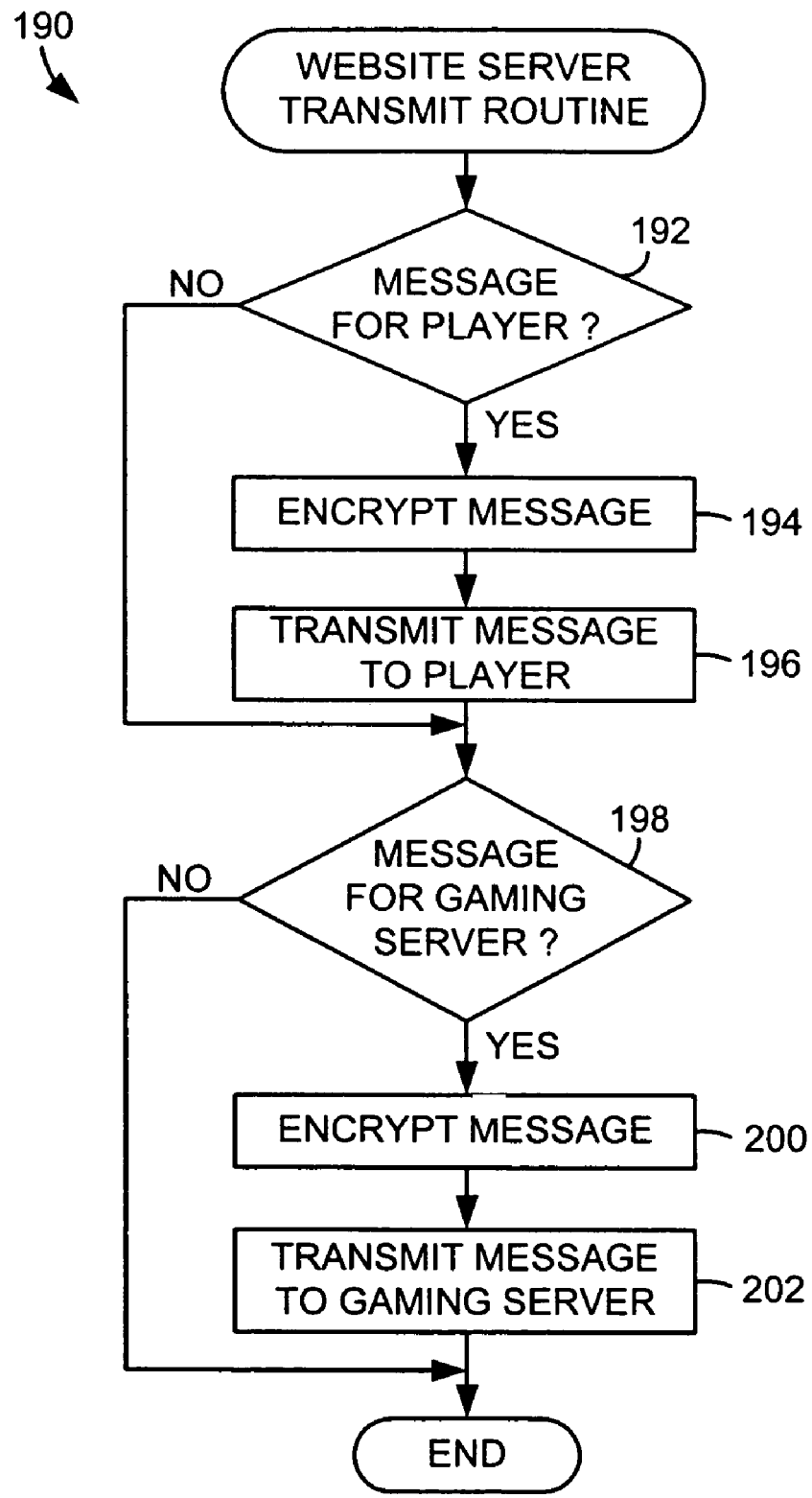
FIG. 5A is a flowchart of an embodiment of a website server transmit routine.

FIG. 5A is a flowchart of one possible embodiment of a website server transmit routine 190 that may be performed by the website controller 50 (FIG. 2B) to transmit data messages originating from the website server 14 to either a gaming server 16 or one of the player terminals 12. The data messages could be, for example, messages containing the display data necessary for generating the logon display 130 (FIG. 3A) and the game-selection display 150 (FIG. 3B) or messages containing other types of data.

The data messages transmitted between the player terminals 12, the website server 14, and the gaming servers 16 may include a header that specifies the type of data message, a source address indicating the source of the message, a destination address indicating the destination to which the message is to be sent, a data field indicating the number of data bytes that are included in the message, and other data fields such as data fields relating to error detection and/or correction. All data messages transmitted between the player terminals 12, the website server 14, and the gaming servers 16 may be encrypted for security purposes.

Referring to FIG. 5A, if an outgoing data message is to be sent to one of the player terminals 12 as determined at block 192, the routine may cause the data message to be encrypted at block 194. Any encryption program or routine could be utilized, such as one based on private key/public key encryption. At block 196, the encrypted message may then be sent to the player terminal 12 specified by the destination address of the message. When received by the player terminal 12, the data message may be decrypted via decryption software that is routinely provided as part of an Internet access program provided with personal computers, such as the Internet Explorer® program marketed by Microsoft®.

If an outgoing data message is to be sent to one of the gaming servers 16 as determined at block 198, the routine may cause the data message to be encrypted at block 200, and the encrypted message may then be sent to the gaming server 16 specified by the destination address of the message at block 202.

Website Server Receive Routine

Figure 5B:
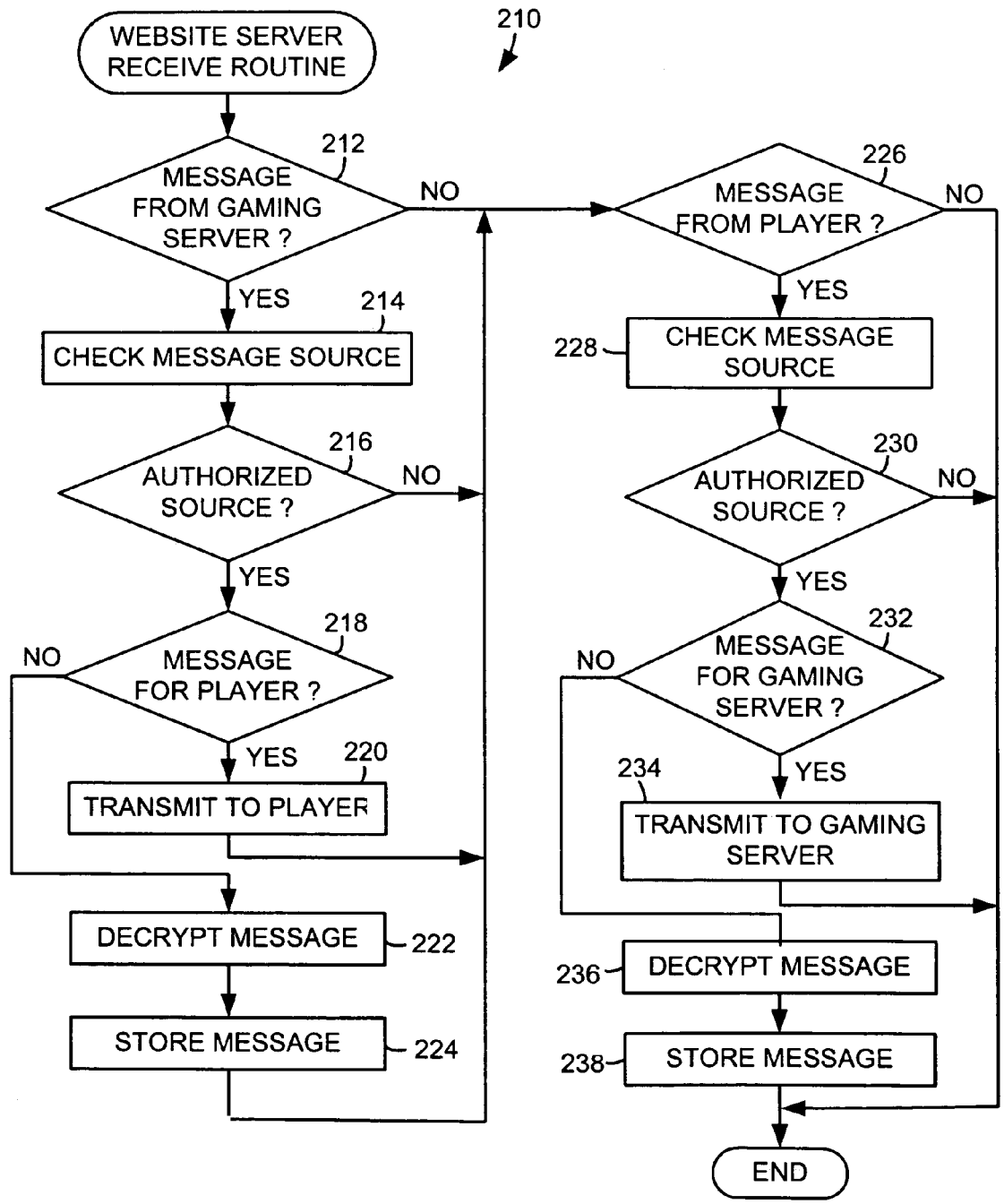
FIG. 5B is a flowchart of an embodiment of a website server receive routine.

FIG. 5B is a flowchart of one possible embodiment of a website server receive routine 210 that may be performed by the website controller 50 (FIG. 2B) to process data messages received by the website server 14 from either a gaming server 16 or one of the player terminals 12. The data messages could be, for example, messages from the gaming servers 16 intended for player terminals 12 and containing the display data necessary for generating various game displays (see for example FIGS. 6, 7, 10, 11 and 14), messages from the gaming servers 16 intended for the website server 14 and containing gaming session data (see for example FIG. 3D), messages from player terminals 12 intended for the website server 14 and containing player data such as logon data, and messages from player terminals 12 intended for the gaming terminals 16 and containing, for example, wager data or gaming instruction data such as data indicating what cards of a poker hand should be held in a draw poker game.

Referring to FIG. 5B, at block 212 the routine may determine whether the message was received from one of the gaming servers 16, which may be accomplished by determining whether it was received via the data link 22 (see FIGS. 1 and 2B) or the data link 28. If received via the data link 22 (i.e. from one of the gaming servers 16), the routine may branch to block 214 where the routine may check the source of the message.

For security purposes, the website server 14 may be designed to accept incoming data messages from authorized sources only. One manner of determining whether an incoming data message was transmitted by an authorized source is to check the source address of the data message and to only accept data messages having an authorized source address. To determine whether a data message received via the data link 22 is authorized, the website server 14 may compare the source address of each data message that is received via the data link 22 to determine whether it matches one of the known source addresses of the gaming servers 16 coupled to the website server 14. If the source address of an incoming data message does not match one of the authorized source addresses, it may be considered to be an unauthorized message.

At block 216, if the received message is not an authorized message, the routine may simply ignore the message by branching to block 226. Alternatively, a security action may be taken, such as displaying a warning message to an operator of the website via the display unit 70 (FIG. 2B).

If the received message is an authorized message as determined at block 216, the routine may determine whether the message is intended for the website server 14 or one of the player terminals 12. That may be accomplished by checking the destination address of the received message. If the message is intended for one of the player terminals 12, the message may be transmitted to the designated player terminal 12 at block 220. If the message is not intended for one of the player terminals 12 (meaning its intended destination is the website server 14), the routine may branch to block 222 where the data portion of the message may be decrypted and to block 224 where the message may be stored in memory so that it any necessary action can be subsequently taken by the website server 14.

At block 226, the routine may determine whether a message was received from one of the player terminals 12, which may be accomplished by determining if it was received via the data link 28 (see FIGS. 1 and 2B). If received via the data link 28 (i.e. from one of the player terminals 12), the routine may branch to block 228 where the routine may check the source of the message to determine whether it is an authorized message. The website server 14 may store a list of authorized player terminals 12 by storing the Internet addresses of all players who have successfully logged on to the website. At block 230, if the received message is an authorized message, the routine may determine whether the message is intended for the website server 14 or one of the gaming servers 16, which may be accomplished by checking the destination address of the received message. If the message is intended for one of the gaming servers 16, the message may be transmitted to the designated gaming server 16 at block 234. If the message is not intended for one of the gaming servers 16 (meaning its intended destination is the website server 14), the routine may branch to block 236 where the data portion of the message may be decrypted and to block 238 where the message may be stored in memory so that it any necessary action can be subsequently taken by the website server 14.

Gaming Server Communication Routine

Figure 5C:
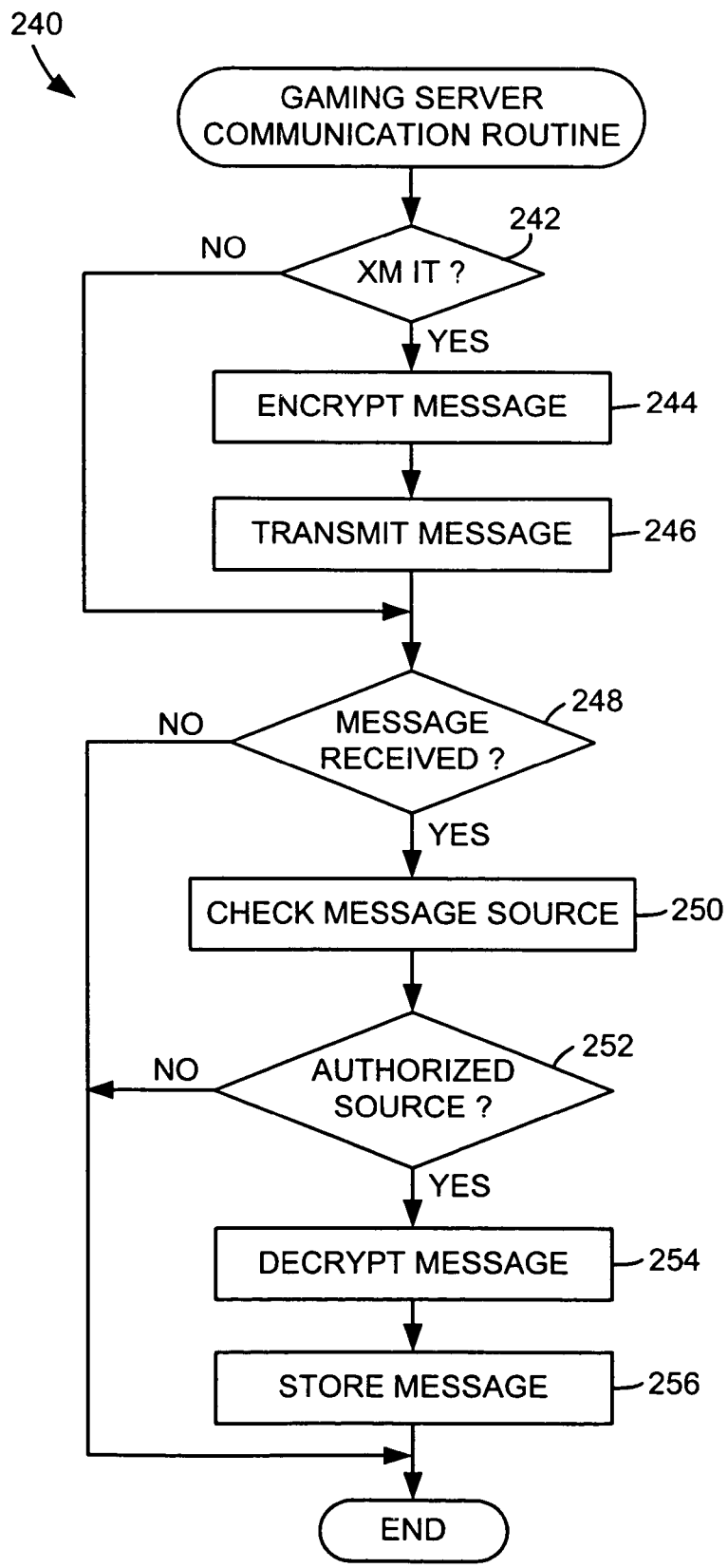
FIG. 5C is a flowchart of an embodiment of a gaming server communication routine.

FIG. 5C is a flowchart of one possible embodiment of a gaming server communication routine 240 that may be performed by a gaming server controller 80 (FIG. 2C) to transmit data messages to the website server 14 or process data messages received from the website server 14. Referring to FIG. 5C, if a data message needs to be transmitted as determined at block 242, the routine may cause the data message to be encrypted at block 244 and the encrypted data message to be transmitted to the website server 14 at block 246.

At block 248, if a message has been received, at block 250 the routine may check the source of the message as described above to determine whether it is an authorized message. At block 252, if the received message is an authorized message, the routine may branch to block 254 where the data portion of the message may be decrypted and to block 256 where the message may be stored in memory so that it any necessary action can be subsequently taken by the gaming server 16

Gaming Data Recording

During operation of the gaming system 10, various gaming data may be stored in memory, in either the website server 14 or the gaming server 16 or both of the servers 14, 16, so that the data may be retrieved or utilized later for various purposes. FIGS. 3C and 3D illustrate a database 300, which may be a relational database, that may be stored in one or both of the servers 14, 16.

Referring to FIG. 3C, the database 300 may have a plurality of player data records 302, which may include a data record 302 for each player who has ever logged onto the website. The middle portion of FIG. 3C illustrates one example of the contents of each of the player records 302. Each player record 302 may include a data record 304 that contains player data and one or more gaming session records 306, each of which may correspond to a respective gaming session engaged in by the player. A gaming session could relate to all gaming activity performed by the player during a single logon to the website and a subsequent logoff.

The right-hand portion of FIG. 3C illustrates data which may be stored in the data record 304, which may include a player identification number that may uniquely identify the player in a data field 310, data representing the name of the player in data fields 312, 314, data representing the address of the player in data fields 316, 318, data representing the player's password in a data field 320, and credit card information in data fields 322, 324. The data stored in data fields 310-324 may simply be the logon data provided by the player during the logon procedure described above.

The right-hand portion of FIG. 3C illustrates data which may be stored in one of the gaming session records 306, which may include the identification number of the player in a data field 326, the credit card number used for that particular gaming session in a data field 328, and a data record 330 that stores various gaming data. Referring to FIG. 3D, the gaming data of each data record 330 may include, for each game played by the player during the session, a game identification number that identifies the game that was played, the wager(s) that was made during the game, the amount won, the amount lost, an initial number of credits, a remaining number of credits, and the time that elapsed during play of the game. The wagers, amounts won, amounts lost, initial credits, and remaining credits may be recorded in currency amounts, such as U.S. dollars. The elapsed time may be recorded in seconds (as shown in FIG. 3D) or minutes.

The database 300 may be continuously updated during the time that players are logged onto the website and are playing games. Various manners of updating the database 300 may be used. For example, the data shown in FIG. 3D could be added to the database 300 on a real-time basis, such as within 5 or 10 seconds of a data event occurring (e.g. the wager amount could be updated within 5 or 10 seconds of a player making a wager). Alternatively, the data shown in FIG. 3D could be added to the database 300 upon completion of each game played, or upon completion of a gaming session by a player.

If the database 300 is stored in both the gaming servers 16 and the website server 14, the database 300 could be updated at different rates. For example, the database 300 stored in one of the gaming servers 16 could be updated on a real-time basis (as described above) and the database 300 stored in the website server 14 could be updated after the completion of each game, or after completion of a gaming session. Updating the database 300 stored in the website server 14 may be accomplished by the transmission of periodic data messages, which may contain all or a part of the data shown in FIG. 3D, from the gaming servers 16 to the website server 14.

Gaming Server Operation

As described above, each game available via the website is played via one of the gaming servers 16 operatively coupled to the website server 14. Examples of the draw poker, slots A, blackjack, bingo and keno games represented by the game icons 152, 162, 166, 168, 170, respectively, shown in FIG. 3B are described below. In view of the above description, it should be understood that each of the following game routines may be performed by a different one of the gaming servers 16, or that one of the gaming servers 16 may perform more than one of the game routines.

One of the game routines described below may begin execution upon the transfer of operational control from the website server 14 to one of the gaming servers 16 as described above in connection with block 176 of FIG. 4. Upon the completion of one of the game routines (i.e. when a player desired to stop playing a particular game), the website server 14 would make that determination at block 122 of FIG. 4 as described above and would begin operation at block 124 as described above.

1. Draw Poker

Figure 6:
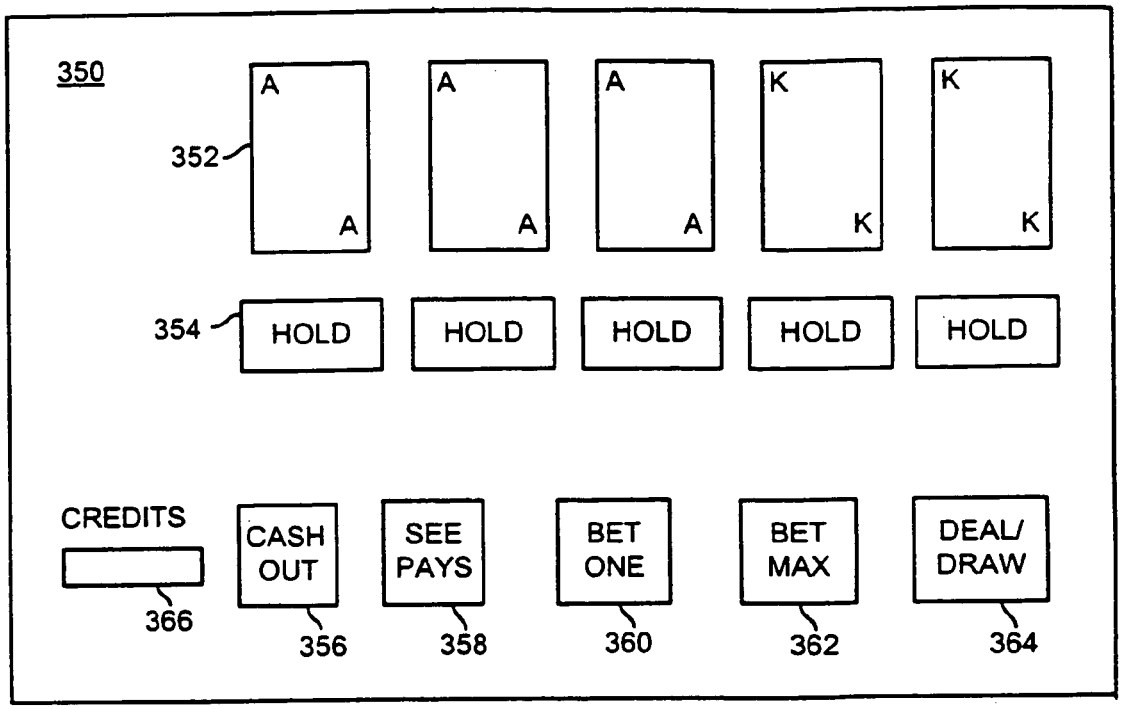
FIG. 6 is an illustration of an embodiment of a visual display that may be displayed during performance of the poker routine of FIG. 8.

FIG. 6 is an exemplary display 350 that may be caused to be displayed on the display unit 44 of one of the player terminals 12 (by a gaming server 16 sending display data to the player terminal 12) during performance of a draw poker routine 351 that may be performed by one of the gaming servers 16.

Referring to FIG. 6, the display 350 may include video images 352 of a plurality of playing cards representing the player's hand, such as five cards. To allow the player to control the play of the poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. The buttons may be activated with the use of a mouse as described above.

Figure 8:
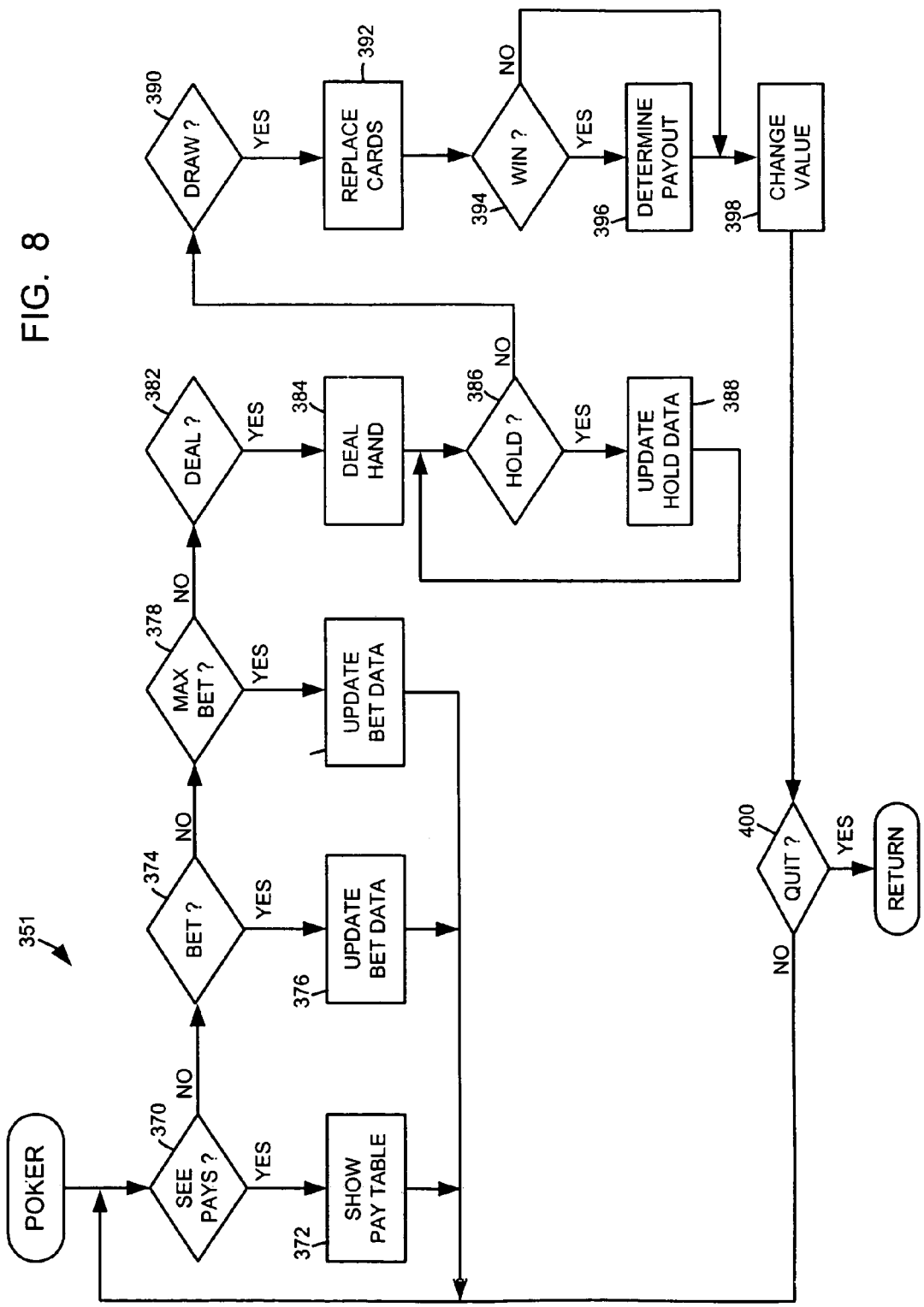
FIG. 8 is a flowchart of an embodiment of a poker routine that may be performed by the system.

FIG. 8 is a flowchart of the poker routine 351. Referring to FIG. 8, at block 370, if the player has requested payout information, such as by activating the "See Pays" button 358, at block 372 the routine may cause one or more pay tables to be displayed on the display unit 44 of the player terminal 12 (by transmitting to the player terminal 12 display data representing the pay tables). At block 374, if the player has made a bet (e.g. if the gaming server 16 has received bet data, such as a "Bet One Credit" data message, from the player terminal 12), at block 376 bet data corresponding to the bet made by the player may be stored in the memory of the gaming server controller 80. At block 378, the routine may determine whether the player has activated the "Bet Max Credits" button 362 (by detecting receipt of a "Bet Max Credits" data message from the player terminal 12), in which case at block 380 bet data corresponding to the maximum allowable bet may be stored in the memory of the gaming server controller 80.

At block 382, the routine may determine if the player desires a new hand to be dealt, which may be determined by detecting receipt of a "Deal/Draw" data message from the player terminal 12 after a wager was made. In that case, at block 384 a video poker hand may be "dealt" by causing the display unit 44 to generate the playing card images 352 (by transmitting one or more messages to the player terminal 12 with suitable display data). After the hand is dealt, at block 386 the routine may determine if a "Hold" data message has been received from the player terminal 12, in which case data regarding which of the playing card images 352 are to be "held" may be stored in the memory of the gaming server controller 80 at block 388. If a "Deal/Draw" data message was received by the gaming server 16 as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the gaming server controller 80. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 6).

Blackjack

Figure 7:
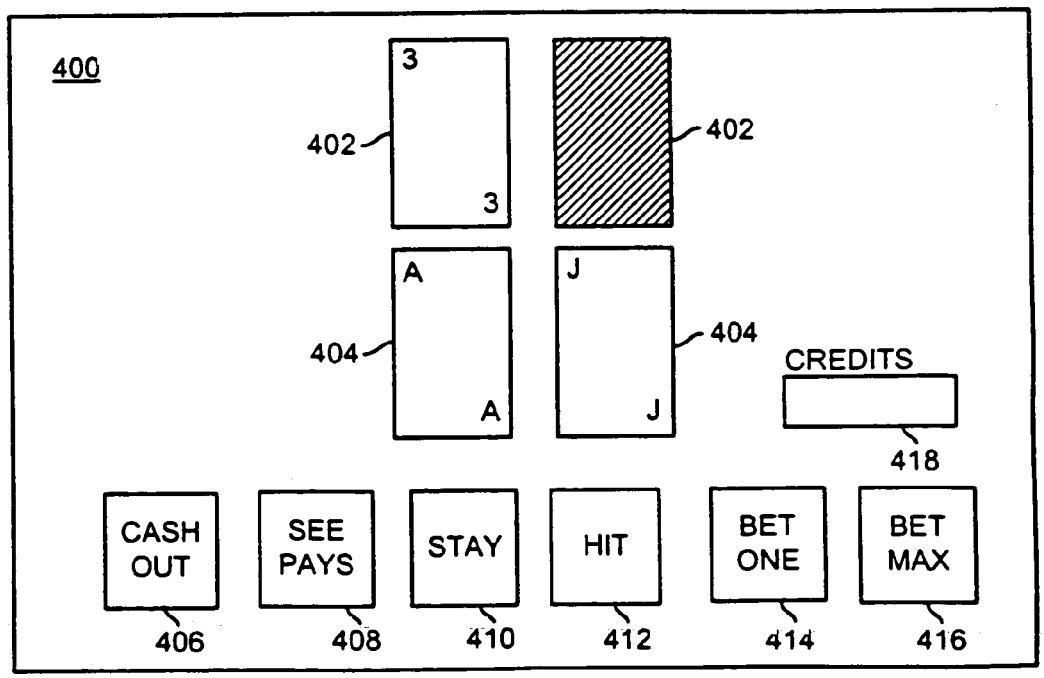
FIG. 7 is an illustration of an embodiment of a visual display that may be displayed during performance of the blackjack routine of FIG. 9.

FIG. 7 is an exemplary display 400 that may be caused to be displayed on the display unit 44 of one of the player terminals 12 (by a gaming server 16 sending display data to the player terminal 12) during performance of a blackjack routine 401. Referring to FIG. 7, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming server 16.

To allow the player to control the play of the blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. The buttons may be activated with the use of a mouse as described above.

Upon activation of each of the buttons, a corresponding data message may be transmitted from the player terminal 12 to the gaming server 16. The data message may have a source address that identifies the player terminal 12 sending the message, a destination address that identifies the gaming server 16 to which the message is to be sent, and a data field that contains data corresponding to the button, such as wager data, game instruction data (e.g. whether to "hit" or "stay"), etc.

Figure 9:
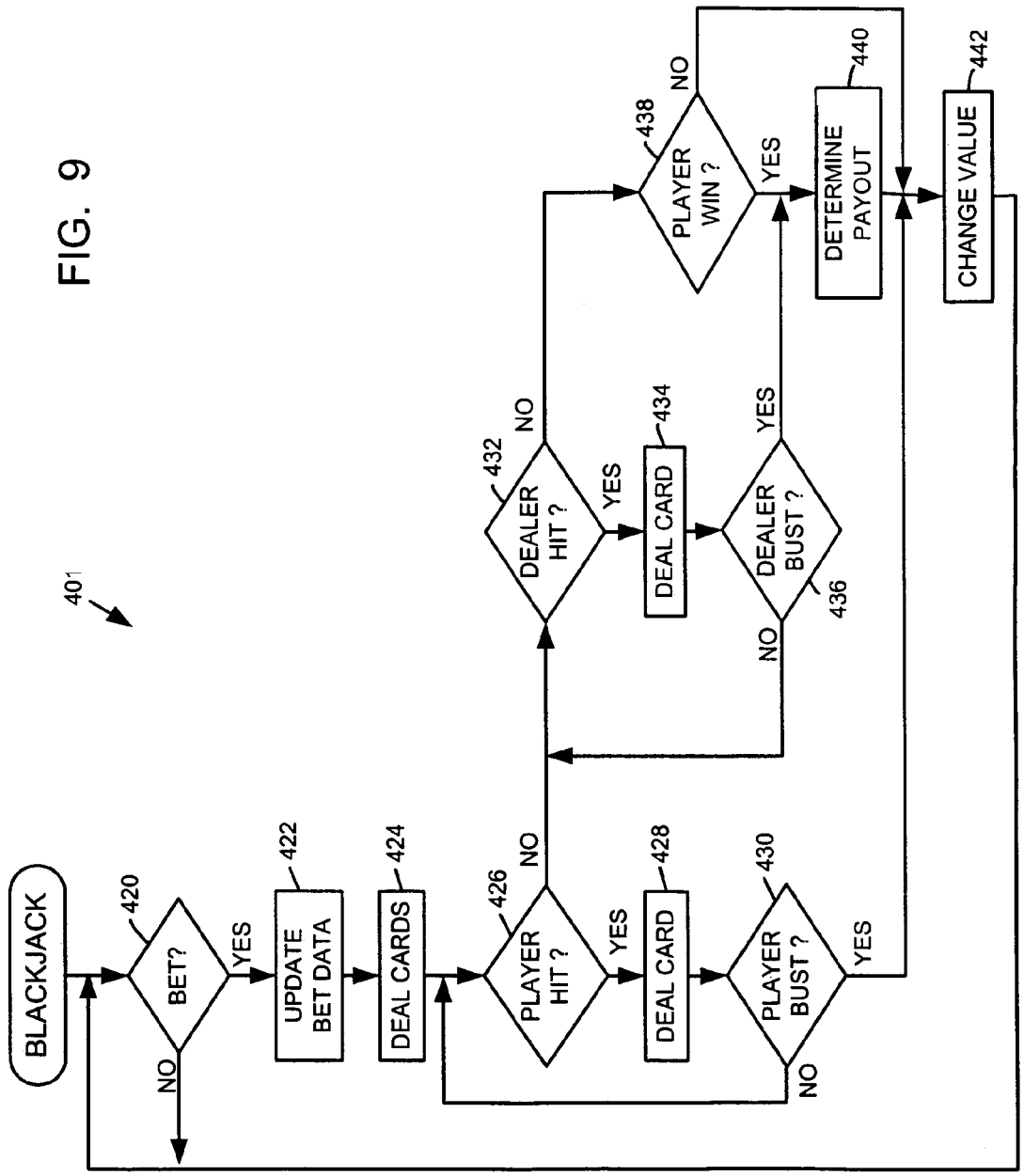
FIG. 9 is a flowchart of an embodiment of a blackjack routine that may be performed by the system.

FIG. 9 is a flowchart of the blackjack routine 401. Referring to FIG. 9, the blackjack routine 401 may begin at block 420 where it may determine whether a bet has been made by the player (e.g. by determining if a "Bet One Credit" data message or a "Bet Max Credits" data message has been received by the gaming server 16 from the player terminal 12). At block 422, bet data corresponding to the bet made at block 420 may be stored in the memory of the controller 80. At block 424, a dealer's hand and a player's hand may be "dealt" by making the playing card images 402, 404 appear on the display unit 44 of the player terminal 12.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 7).

Slots A

FIG. 10 is an exemplary display 450 that may be caused to be displayed on the display unit 44 of one of the player terminals 12 (by a gaming server 16 sending display data to the player terminal 12) during performance of a slots routine 451. Referring to FIG. 10, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Upon activation of each of the buttons, a corresponding data message may be transmitted from the player terminal 12 to the gaming server 16. The data message may have a source address that identifies the player terminal 12 sending the message, a destination address that identifies the gaming server 16 to which the message is to be sent, and a data field that contains data corresponding to the button, such as wager data, game instruction data (e.g. spin), etc.

Figure 12:
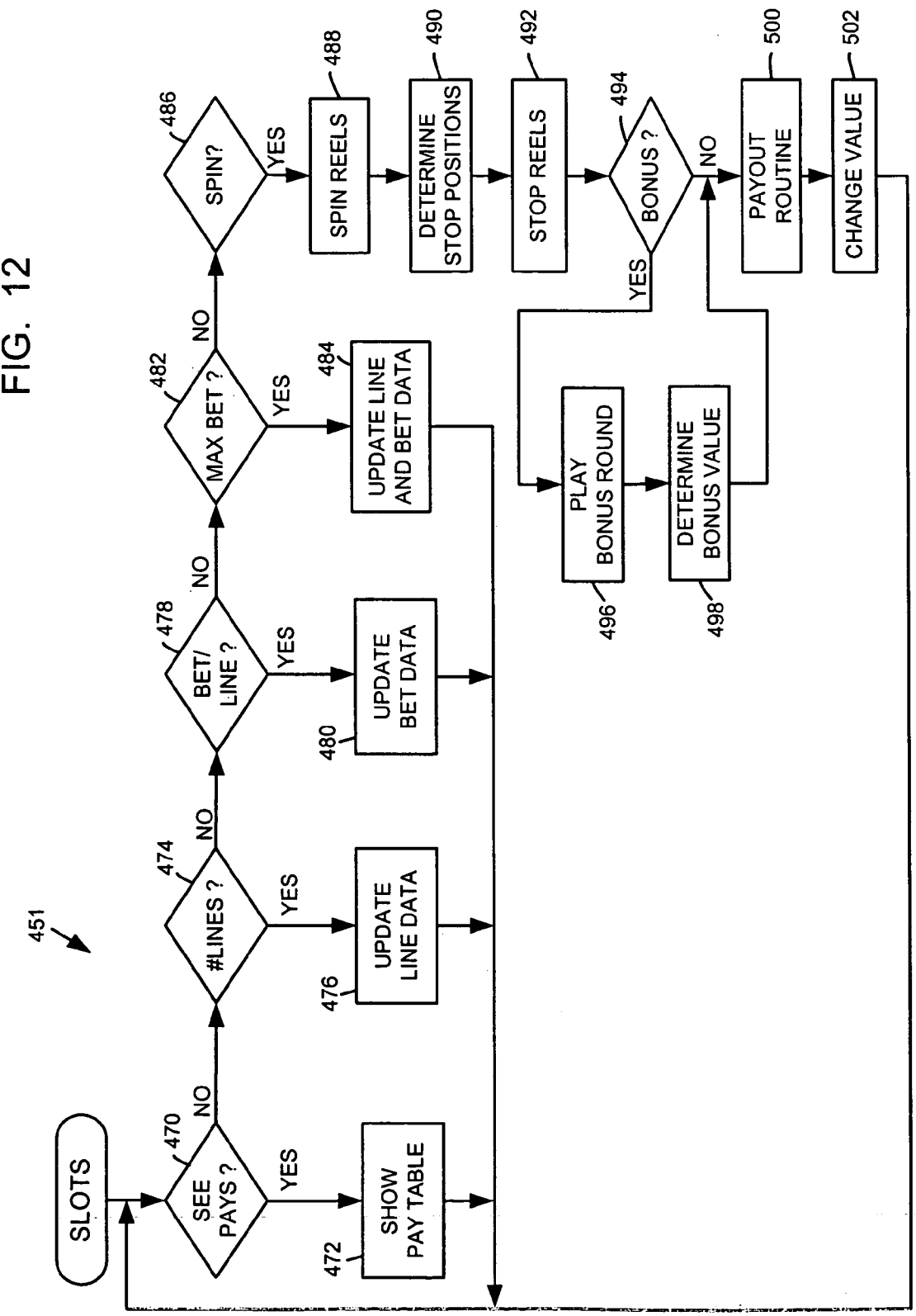
FIG. 12 is a flowchart of an embodiment of a slots routine that may be performed by the system.

FIG. 12 is a flowchart of the slots routine 451. Referring to FIG. 12, at block 470, if the player has requested payout information, which may be determined by detecting receipt by the gaming server 16 of a "See Pays" data message, at block 472 the routine may cause one or more pay tables to be displayed on the display unit 44. At block 474, if a data message is received by the gaming server 16 as a result of the player pressing one of the payline-selection buttons 460, at block 476 data corresponding to the number of paylines selected by the player may be stored in the memory of the controller 80. At block 478, if the player has pressed one of the bet-selection buttons 462, at block 480 data corresponding to the amount bet per payline may be stored in the memory of the controller 80. At block 482, if a "Max Bet" data message has been received by the gaming server 16, at block 484 bet data (which may include both payline data and bet-per-payline data) corresponding to the maximum allowable bet may be stored in the memory of the controller 80.

If a "Spin" data message has been received from the player terminal 12 as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Keno

FIG. 11 is an exemplary display 520 that may be caused to be displayed on the display unit 44 of one of the player terminals 12 (by a gaming server 16 sending display data to the player terminal 12) during performance of a keno routine 521. Referring to FIG. 11, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed.

Upon activation of each of the buttons, a corresponding data message may be transmitted from the player terminal 12 to the gaming server 16. The data message may have a source address that identifies the player terminal 12 sending the message, a destination address that identifies the gaming server 16 to which the message is to be sent, and a data field that contains data corresponding to the button, such as wager data, game instruction data, etc.

Figure 13:
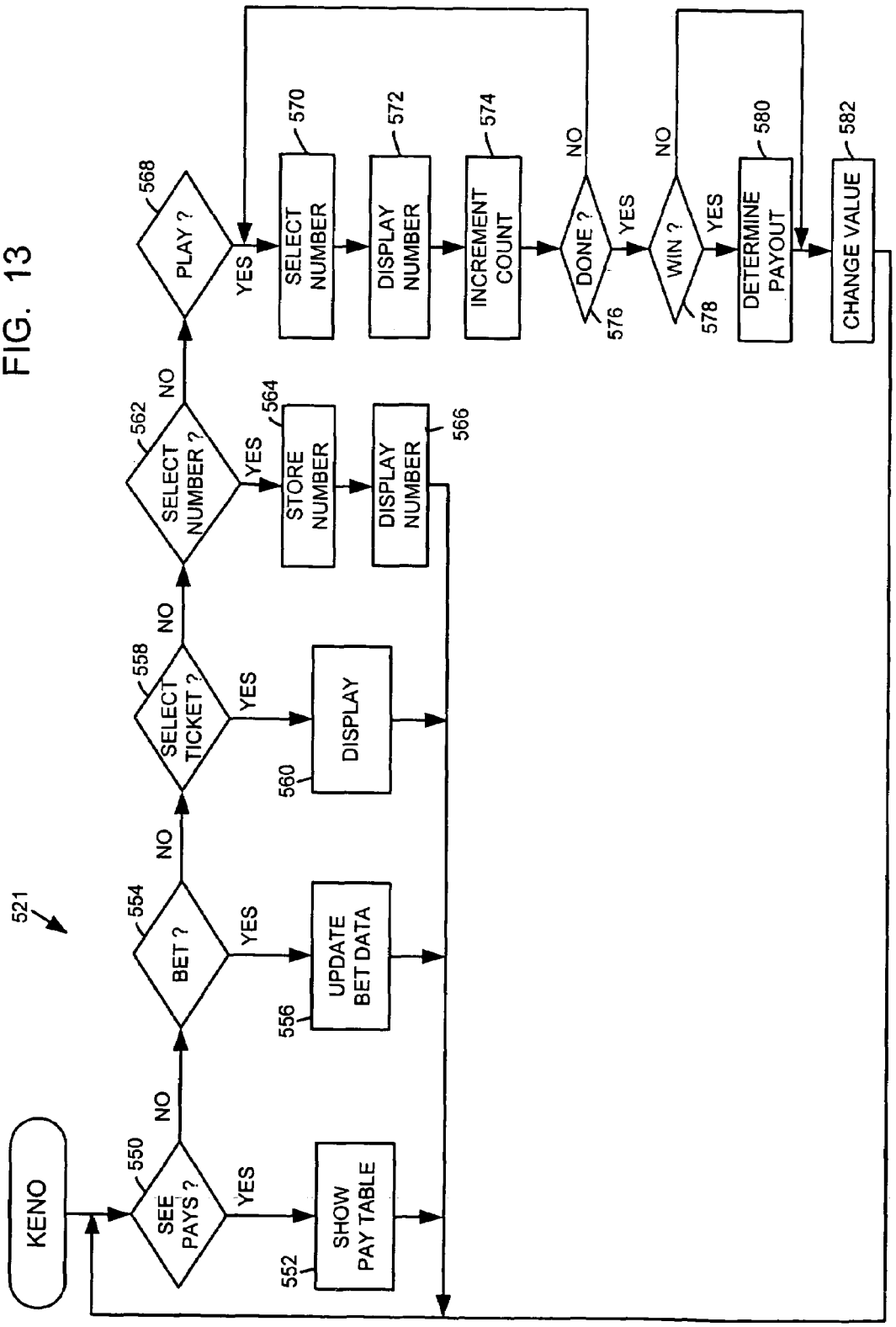
FIG. 13 is a flowchart of an embodiment of a keno routine that may be performed by one or more of the gaming units.

FIG. 13 is a flowchart of the keno routine 521. The keno routine 521 may be utilized in connection with a single player terminal 12 where a single player is playing a keno game, or the keno routine 521 may be utilized in connection with multiple player terminals 12 where multiple players are playing a single keno game.

Referring to FIG. 13, at block 550, if a "See Pays" data message has been received from the player terminal 12, at block 552 the routine may cause one or more pay tables to be displayed on the display unit 44. At block 554, if bet data has been received from the player terminal 12, such as by receiving a "Bet One Credit" data message or a "Bet Max Credits" data message, at block 556 bet data corresponding to the bet made by the player may be stored in the memory of the controller 80. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 80 at block 564 and may be included in the image 522 on the display 520 at block 566. After a certain amount of time, the keno game may be closed to additional players (where a number of players are playing a single keno game using multiple player terminals 12).

If play of the keno game is to begin as determined at block 568, at block 570 a game number within a range set by the casino may be randomly selected by the controller 80. At block 572, the randomly selected game number may be displayed on the display unit 44 and the display units 44 of other player terminals 12 (if any) which are involved in the same keno game. At block 574, the controller 80 may increment a count which keeps track of how many game numbers have been selected at block 570.

At block 576, the routine may determine whether a maximum number of game numbers within the range have been randomly selected. If not, another game number may be randomly selected at block 570. If the maximum number of game numbers has been selected, at block 578 the routine may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 11).

Bingo

Figure 14:
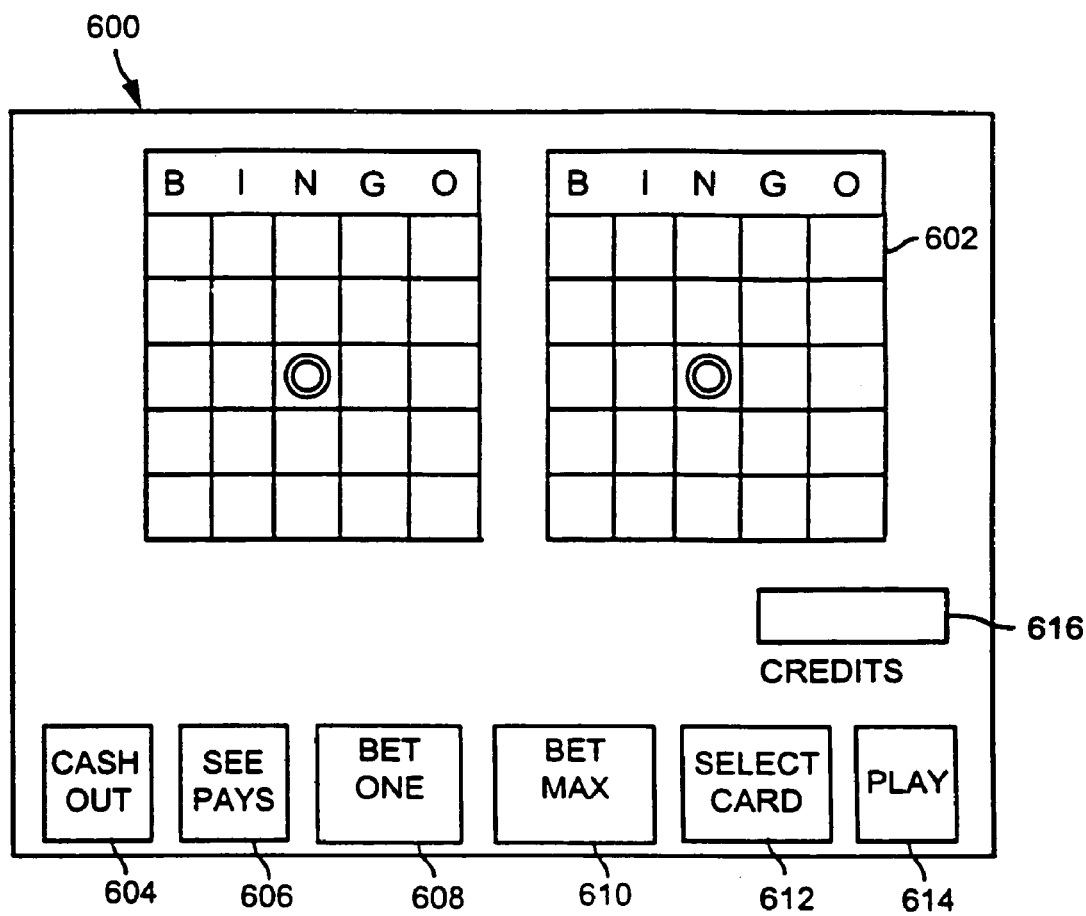
FIG. 14 is an illustration of an embodiment of a visual display that may be displayed during performance of the bingo routine of FIG. 15.

FIG. 14 is an exemplary display 600 that may be caused to be displayed on the display unit 44 of one of the player terminals 12 (by a gaming server 16 sending display data to the player terminal 12) during performance of a bingo routine 601. Referring to FIG. 14, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed.

Upon activation of each of the buttons, a corresponding data message may be transmitted from the player terminal 12 to the gaming server 16. The data message may have a source address that identifies the player terminal 12 sending the message, a destination address that identifies the gaming server 16 to which the message is to be sent, and a data field that contains data corresponding to the button, such as wager data, game instruction data, etc.

Figure 15:
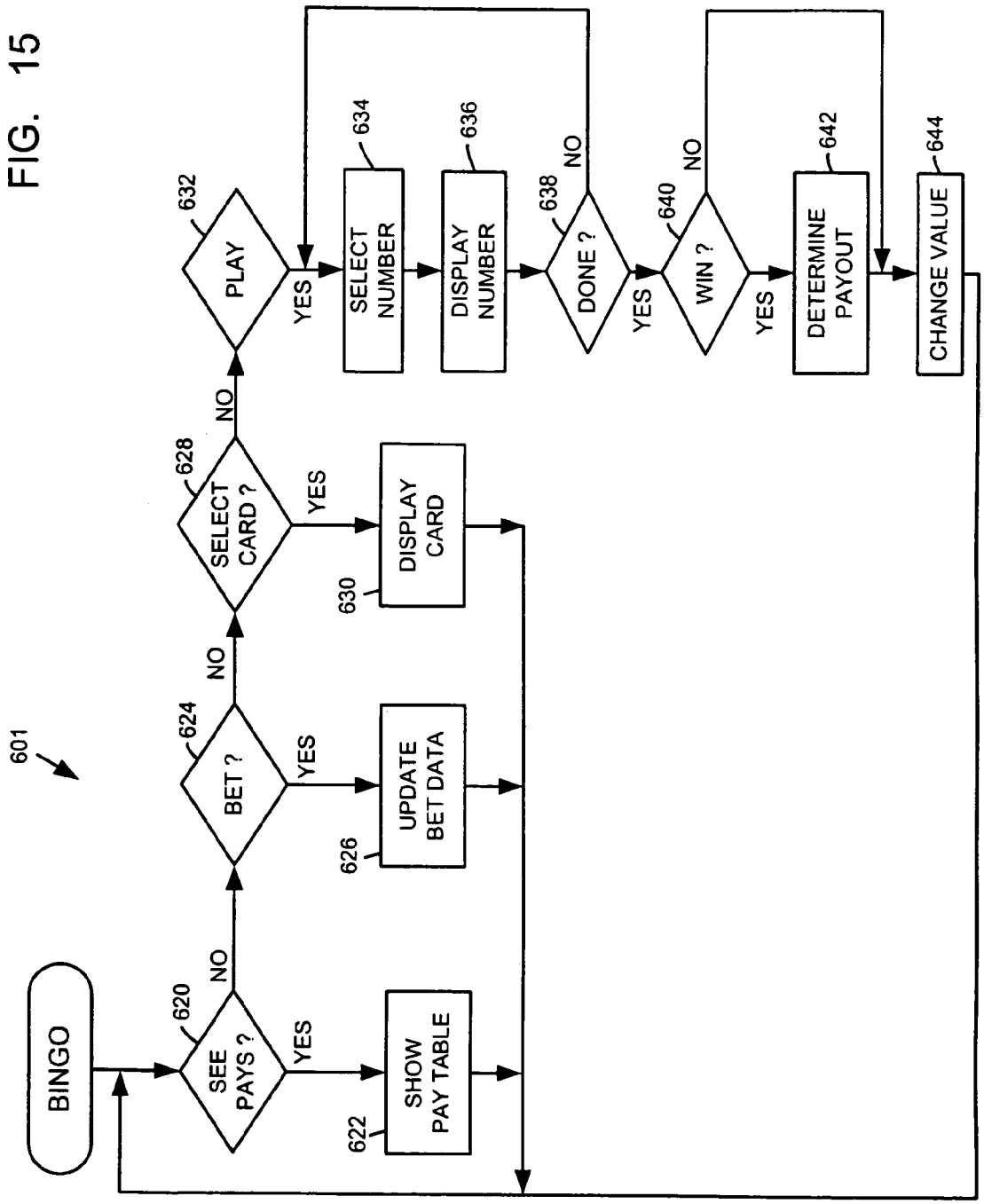
FIG. 15 is a flowchart of an embodiment of a bingo routine that may be performed by the system.

FIG. 15 is a flowchart of the bingo routine 601. The bingo routine 601 may be utilized in connection with a single player terminal 12 where a single player is playing a bingo game, or the bingo routine 601 may be utilized in connection with multiple player terminals 12 where multiple players are playing a single bingo game.

Referring to FIG. 15, at block 620, if the player has requested payout information, which may be determined by detecting receipt of a "See Pays" data message from the player terminal 12, at block 622 the routine may cause one or more pay tables to be displayed on the display unit 44 of the player terminal 12. At block 624, if bet data has been received from the player terminal 12, such as a "Bet One Credit" data message or a "Bet Max Credits" data message, at block 626 the bet data corresponding to the bet made by the player may be stored in the memory of the controller 80.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the routine. At block 636, the bingo number may be displayed on the display unit 44 of the player terminal 12 and the display units 44 of any other player terminals 12 involved in the bingo game.

Referring to FIG. 13, at block 550, if a "See Pays" data message has been received from the player terminal 12, at block 552 the routine may cause one or more pay tables to be displayed on the display unit 44. At block 554, if bet data has been received from the player terminal 12, such as by receiving a "Bet One Credit" data message or a "Bet Max Credits" data message, at block 556 bet data corresponding to the bet made by the player may be stored in the memory of the controller 80. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 80 at block 564 and may be included in the image 522 on the display 520 at block 566. After a certain amount of time, the keno game may be closed to additional players (where a number of players are playing a single keno game using multiple player terminals 12).

What is claimed is:

1. A gaming system that allows players to play games via a plurality of remote player devices, said gaming system comprising:
    a first gaming server that facilitates play of a first game by a player utilizing one of said remote player devices, said first gaming server comprising a controller that comprises a processor and a memory in which image data corresponding to a video image representing said first game is stored, said controller being programmed to facilitate play of said first game and said first game being one of the following games: poker, blackjack, slots, keno or bingo;
    a second gaming server that facilitates play of a second game by a player utilizing one of said remote player devices, said second game being different than said first game, said second gaming server comprising a controller that comprises a processor and a memory in which image data corresponding to a video image representing said second game is stored, said controller of said second gaming server being programmed to facilitate play of said second game and said second game being one of the following games: poker, blackjack, slots, keno or bingo; and
    a website server that is capable of being operatively coupled via the Internet to said remote player devices, said website server capable of being operatively coupled to said first and second gaming servers, said website server comprising:
    a controller that comprises a processor and a memory; and
    a network communications circuit coupled to said controller of said website server, said network communications circuit allowing data to be communicated between said controller of said website server and said remote player devices,
    said controller of said website server being programmed to select logon display data and to cause said logon display data to be transmitted to one of said remote player devices via said network communications circuit when said one remote player device is operatively coupled to said website server,
    said controller of said website server being programmed to cause player data received from said one remote player device to be stored in memory,
    said controller of said website server being programmed to cause data representing a game selection display to be transmitted to said one remote player device, said game selection display comprising a first image representing said first game and a second image representing said second game,
    said controller of said website server being programmed to receive data representing a game selection from said one remote player device,
    said controller of said website server being programmed to determine whether said data representing said game selection corresponds to said first game or said second game;
    said controller of said website server being programmed to determine whether to select said first gaming server or said second gaming server based on said game selection received from said one remote player device;
    said controller of said website server being programmed to select said first gaming server for data communication between said one remote player device and said first gaming server if said player selected said first game for play, and
    said controller of said website server being programmed to select said second gaming server for data communication between said one remote player device and said second gaming server if said player selected said second game for play.

2. A gaming system as defined in claim 1,
    wherein said memory of said first gaming server stores image data representing an image of at least five playing cards if said first game comprises poker, wherein said memory of said first gaming server stores image data representing an image of a plurality of simulated slot machine reels if said first game comprises slots,
    wherein said memory of said first gaming server stores image data representing an image of a plurality of playing cards if said first game comprises blackjack,
    wherein said memory of said first gaming server stores image data representing an image of a plurality of keno numbers if said first game comprises keno, and
    wherein said memory of said first gaming server stores image data representing an image of a bingo grid if said first game comprises bingo.

3. A gaming system as defined in claim 1 wherein said controller of said first gaming server comprises a plurality of processors capable of parallel operation.

4. A gaming system as defined in claim 1 wherein said first game and said second game are the same type of game.

5. A gaming system as defined in claim 4 wherein said first game comprises a single-hand poker game and wherein said second game comprises a multi-hand poker game.

6. A gaming system as defined in claim 1 wherein said controller of one of said gaming servers is programmed to encrypt data transmitted to said website server and wherein said controller of said website server is programmed to decrypt data received by said website server from one of said gaming servers.

7. A gaming system as defined in claim 1 wherein one of said controllers of one of said gaming servers is programmed to determine whether a data communication received by said one gaming server was transmitted by an authorized sender.

8. A gaming system as defined in claim 1, wherein said first game may be played exclusively via said first gaming server, wherein said controller of said first gaming server is not programmed to facilitate play of said second game, and wherein said memory of said first gaming server does not store image data corresponding to a video image representing said second game; and
    wherein said second game may be played exclusively via said second gaming server, wherein said controller of said second gaming server is not programmed to facilitate play of said first game, and wherein said memory of said second gaming server does not store image data corresponding to a video image representing said first game.

9. A website server, comprising:

a network communications circuit that allows data to be communicated between said website server and a plurality of remote player devices when said remote player devices are operatively coupled to said website server; and a controller that controls the operation of said website server, said controller comprising a processor and a memory operatively coupled to said processor, said controller being programmed to select logon display data and to cause said logon display data to be transmitted to one of said remote player devices via said network communications circuit when said one remote player device is operatively coupled to said web site server, said controller being programmed to cause player data received from said one remote player device to be stored in memory, said controller being programmed to cause data representing a game selection display to be transmitted to said one remote player device, said game selection display comprising a first image representing a first game and a second image representing a second game, said controller being programmed to receive data representing a game selection from said one remote player device, said controller being programmed to determine whether said data representing said game selection corresponds to said first game or said second game;

said controller being programmed to determine whether to select a first gaming server or a second gaming server based on said game selection received from said one remote player device;

said controller being programmed to select said first gaming server for data communication between said one remote player device and said first gaming server that facilitates play of said first game if said player selected said first game for play, and said controller being programmed to select said second gaming server for data communication between said one remote player device and said second gaming server that facilitates play of said second game if said player selected said second game for play.

10. A website server as defined in claim 9 wherein said first image comprises a first icon and wherein said second image comprises a second icon and wherein said controller of said website server is programmed to cause data representing said first and second icons to be transmitted to said one remote player device.

11. A website server as defined in claim 9 wherein said controller comprises a plurality of processors capable of parallel operation.

12. A website server as defined in claim 9 wherein said first game and said second game are the same type of game.

13. A website server as defined in claim 12 wherein said first game comprises a single-hand poker game and wherein said second game comprises a multi-hand poker game.

14. A website server as defined in claim 9 wherein said controller is programmed to decrypt data received by said website server from one of said gaming servers.

15. A website server as defined in claim 9 wherein said controller is programmed to determine whether a data communication received by one of said gaming servers was transmitted by an authorized sender.

16. A website server, comprising:

a network communications circuit that allows data to be communicated between said website server and a plurality of remote player devices when said remote player devices are operatively coupled to said website server; and a controller that controls the operation of said website server, said controller comprising a processor and a memory operatively coupled to said processor, said controller being programmed to retrieve from said memory data prompting a game selection to be made, and to cause said data prompting a game selection to be made to be transmitted to one of said remote player devices to prompt a player to select at least a first game or a second game;

said controller being programmed to receive game selection data representing a game selection from said one remote player device, said controller being programmed to determine whether said game selection data representing said game selection corresponds to said first game or said second game;

said controller being programmed to determine whether to select a first gaming server or a second gaming server based on said game selection received from said one remote player device;

said controller being programmed to select said first gaming server for data communication between said one remote player device and said first gaming server that facilitates play of said first game if said game selection data specifies said first game, and said controller being programmed to select said second gaming server for data communication between said one remote player device and said second gaming server that facilitates play of said second game if said game selection data specifies said second game.

17. A website server as defined in claim 16 wherein said controller comprises a plurality of processors capable of parallel operation.

18. A website server as defined in claim 16 wherein said first game and said second game are the same type of game.

19. A website server as defined in claim 18 wherein said first game comprises a single-hand poker game and wherein said second game comprises a multi-hand poker game.

20. A website server as defined in claim 16 wherein said controller is programmed to decrypt data received by said website server from one of said gaming servers.

21. A website server as defined in claim 16 wherein said controller is programmed to determine whether a data communication received by one of said gaming servers was transmitted by an authorized sender.

22. A website controller that controls operation of a website, said controller comprising:

a processor;

a memory operatively coupled to said processor;

a first computer program portion stored in said memory that causes data prompting a game selection to be made to be transmitted to a remote player device to allow a first game or a second game to be selected via said remote player device;

a second computer program portion stored in said memory that causes game selection data representing a game selection that is received from said remote player device to be stored in memory;

a third computer program portion stored in said memory that determines whether said data representing said game selection corresponds to said first game or said second game;

a fourth computer program portion stored in said memory that determines whether to select a first gaming computer or a second gaming computer based on said game selection received from said remote player device;

a fifth computer program portion stored in said memory that facilitates data communication between said remote player device and said first gaming computer that facilitates play of said first game if said game selection data specifies said first game; and a sixth computer program portion stored in said memory that facilitates data communication between said remote player device and said second gaming computer that facilitates play of said second game if said game selection data specifies said second game.

23. A website controller as defined in claim 22 comprising a plurality of processors capable of parallel operation.

24. A website controller as defined in claim 22 wherein said first game and said second game are the same type of game.

25. A website controller as defined in claim 24 wherein said first game comprises a single-hand poker game and wherein said second game comprises a multi-hand poker game.

26. A website controller as defined in claim 22 additionally comprising a computer program portion stored in said memory that determines whether a data communication received by one of said gaming computers was transmitted to said website by an authorized sender.

27. A method of operating a website computing apparatus, comprising:

retrieving logon display data from a memory associated with said website computing apparatus and transmitting said logon display data from said website computing apparatus to a remote player device over the Internet;

receiving player data from said remote player device via the Internet;

transmitting data representing a game selection display to said remote player device via the Internet, said game selection display comprising a first image representing a first game and a second image representing a second game;

receiving game selection data representing a game selection from said remote player device via the Internet;

determining whether said game selection data representing said game selection corresponds to said first game or said second game;

determining whether to select a first gaming computer or a second gaming computer based on said game selection received from said remote player device;

facilitating data communication via the Internet between said remote player device and said first gaming computer that facilitates play of said first game if said game selection data represents said first game, said data communication being conducted through said website computing apparatus; and facilitating data communication via the Internet between said remote player device and said second gaming computer that facilitates play of said second game if said game selection data represents said second game, said data communication between said remote player device and said second gaming computer being conducted through said website computing apparatus.

28. A method as defined in claim 27, additionally comprising:

transmitting to said remote player device display data representing an image of at least five playing cards if said first game comprises poker, transmitting to said remote player device display data representing an image of a plurality of simulated slot machine reels if said first game comprises slots, transmitting to said remote player device display data representing an image of a plurality of playing cards if said first game comprises blackjack, transmitting to said remote player device display data representing an image of a plurality of keno numbers if said first game comprises keno, or transmitting to said remote player device display data representing an image of a bingo grid if said first game comprises bingo.

29. A method of operating a website computing apparatus, comprising:

receiving at said website computing apparatus via the Internet game selection data representing a game selection from a player device remote from said website computing apparatus, said game selection data representing either a first game or a second game;

at said website computing apparatus, determining whether said game selection data representing said game selection corresponds to said first game or said second game;

at said website computing apparatus, determining whether to select a first gaming apparatus or a second gaming apparatus based on said game selection data received from said player device;

at said website computing apparatus, initiating the retrieval of game display data from said first gaming apparatus that facilitates play of said first game if said game selection data represents said first game;

at said website computing apparatus, initiating the retrieval of game display data from said second gaming apparatus that facilitates play of said second game if said game selection data represents said second game;

transmitting said game display data received from one of said gaming apparatuses to said remote player device via the Internet;

receiving at said website computing apparatus wager data from said remote player device via the Internet;

transmitting said wager data from said website computing apparatus to said first gaming apparatus if said game selection data represents said first game; and transmitting said wager data from said website computing apparatus to said second gaming apparatus if said game selection data represents said second game.

30. A method as defined in claim 29, comprising:

transmitting to said remote player device display data representing an image of at least five playing cards if said first game comprises poker, transmitting to said remote player device display data representing an image of a plurality of simulated slot machine reels if said first game comprises slots, transmitting to said remote player device display data representing an image of a plurality of playing cards if said first game comprises blackjack, transmitting to said remote player device display data representing an image of a plurality of keno numbers if said first game comprises keno, or transmitting to said remote player device display data representing an image of a bingo grid if said first game comprises bingo.

31. A method as defined in claim 29, wherein said first gaming apparatus comprises a first gaming server, wherein said second gaming apparatus comprises a second gaming server, and wherein said method comprises:

receiving at said website computing apparatus game display data from said first gaming server if said game selection data represents said first game; and receiving at said website computing apparatus game display data from said second gaming server if said game selection data represents said second game.

32. A method as defined in claim 29, wherein said website computing apparatus comprises a website server and wherein said method comprises:

receiving at said website server via the Internet said game selection data from said player device; and receiving at said website server said wager data from said remote player device via the Internet.

33. A method of operating a gaming apparatus, comprising:

transmitting first game display data from said gaming apparatus to a website computing apparatus, said first game display data representing a first game image relating to a game that may be played via a player device that is remote from said website computing apparatus and that is remote from said gaming apparatus, said first game display data being included in a data communication having a destination address that specifies said player device;

receiving wager data from said website computing apparatus, said wager data being included in a data communication having a source address that specifies said player device;

transmitting second game display data from said gaming apparatus to said website computing apparatus, said second game display data representing a second game image relating to said game, said second game display data being included in a data communication having a destination address that specifies said player device; and transmitting outcome data from said gaming apparatus to said website computing apparatus, said outcome data representing an outcome of said game, said outcome data being included in a data communication having a destination address that specifies said player device.

34. A method as defined in claim 33 additionally comprising:

encrypting said first game display data prior to transmitting said first game display data from said gaming apparatus to said website computing apparatus; and encrypting said second game display data prior to transmitting said second game display data from said gaming apparatus to said website computing apparatus.

35. A method as defined in claim 33 additionally comprising decrypting said wager data after receiving said wager data from said website computing apparatus.

36. A method as defined in claim 33 wherein said website computing apparatus comprises a website server and wherein said method comprises:

transmitting said first game display data from said gaming apparatus to said website server;

receiving said wager data from said website server;

transmitting said second game display data from said gaming apparatus to said website server; and transmitting said outcome data from said gaming apparatus to said website server.

37. A method as defined in claim 33 wherein said gaming apparatus comprises a gaming server and wherein said method comprises:

transmitting said first game display data from said gaming server to said website computing apparatus; transmitting said game display data from said gaming server to said website computing apparatus; and transmitting said outcome data from said gaming server to said website computing apparatus.

* * * * *